United States Patent
Chincisan

(10) Patent No.: US 8,751,682 B2
(45) Date of Patent: *Jun. 10, 2014

(54) DATA TRANSFER USING HIGH SPEED CONNECTION, HIGH INTEGRITY CONNECTION, AND DESCRIPTOR

(75) Inventor: Octavian Chincisan, Richmond Hill (CA)

(73) Assignee: Z124, George Town (KY)

( * ) Notice: Subject to any disclaimer, the term of this patent is extended or adjusted under 35 U.S.C. 154(b) by 781 days.

This patent is subject to a terminal disclaimer.

(21) Appl. No.: 12/891,290

(22) Filed: Sep. 27, 2010

(65) Prior Publication Data

US 2012/0079076 A1 Mar. 29, 2012

(51) Int. Cl.
 *G06F 15/16* (2006.01)
 *G08C 25/02* (2006.01)

(52) U.S. Cl.
 USPC .......................................... 709/237; 714/748

(58) Field of Classification Search
 USPC ........................... 709/230–237; 714/748–750
 See application file for complete search history.

(56) References Cited

U.S. PATENT DOCUMENTS

| | | | |
|---|---|---|---|
| 3,675,209 A * | 7/1972 | Trost et al. ........................ | 710/5 |
| 4,839,453 A | 6/1989 | Chung et al. | |
| 5,488,702 A | 1/1996 | Byers et al. | |
| 5,553,083 A | 9/1996 | Miller | |
| 5,555,391 A | 9/1996 | De Subijana et al. | |
| 5,572,678 A | 11/1996 | Homma et al. | |
| 5,903,724 A | 5/1999 | Takamoto et al. | |
| 5,951,706 A * | 9/1999 | Benner ........................ | 714/749 |
| 6,308,178 B1 | 10/2001 | Chang et al. | |
| 7,031,264 B2 | 4/2006 | Adhikari et al. | |
| 7,047,297 B2 | 5/2006 | Huntington et al. | |
| 7,117,308 B1 * | 10/2006 | Mitten et al. ................... | 711/118 |
| 7,124,152 B2 * | 10/2006 | Fish ...................................... | 1/1 |
| 7,178,060 B2 | 2/2007 | Bamford | |
| 7,272,613 B2 | 9/2007 | Sim et al. | |
| 7,484,000 B2 | 1/2009 | Jiang | |
| 7,551,608 B1 * | 6/2009 | Roy .............................. | 370/352 |
| 7,623,466 B2 | 11/2009 | Whitehead | |
| 7,627,343 B2 | 12/2009 | Fadell | |
| 7,675,939 B2 | 3/2010 | Kawamura et al. | |
| 7,688,867 B1 | 3/2010 | Kizhepat | |
| 7,719,830 B2 | 5/2010 | Howarth | |

(Continued)

FOREIGN PATENT DOCUMENTS

KR 10-0547749 1/2006
KR 10-0547749 B1 1/2006

(Continued)

OTHER PUBLICATIONS

U.S. Appl. No. 13/188,335, filed Jul. 21, 2011, Pocklington.

(Continued)

*Primary Examiner* — Lance L Barry
(74) *Attorney, Agent, or Firm* — Sheridan Ross P.C.

(57) ABSTRACT

Systems and methods for transfer of data including establishing two separate connections, the two separate connections including a high speed connection and a high integrity connection. Blocks of data are exchanged over the high speed connection while the high integrity connection facilitates communication of descriptor data regarding data received over the high speed connection. As such, the data transfer speed of the high speed connection is utilized while communication via the high integrity connection allows for data reliability features not provided by the high speed connection.

25 Claims, 12 Drawing Sheets

(56) References Cited

U.S. PATENT DOCUMENTS

| | | | |
|---|---|---|---|
| 7,885,264 | B2 | 2/2011 | Tateno et al. |
| 8,010,646 | B2 | 8/2011 | Bier et al. |
| 8,027,293 | B2 | 9/2011 | Spaur et al. |
| 8,131,556 | B2 | 3/2012 | Barton et al. |
| 8,161,175 | B2 | 4/2012 | Lu |
| 8,184,552 | B2 | 5/2012 | Onda et al. |
| 8,373,538 | B1 | 2/2013 | Hildner et al. |
| 8,385,200 | B2 | 2/2013 | Rainer et al. |
| 8,391,928 | B2 | 3/2013 | Karaoguz et al. |
| 8,532,124 | B2 | 9/2013 | Satterlee et al. |
| 2001/0037406 | A1 | 11/2001 | Philbrick et al. |
| 2002/0002550 | A1 | 1/2002 | Berman |
| 2002/0110134 | A1* | 8/2002 | Gracon et al. ............. 370/412 |
| 2003/0063324 | A1 | 4/2003 | Takaoka |
| 2003/0097481 | A1 | 5/2003 | Richter |
| 2004/0121778 | A1 | 6/2004 | Hunkeler et al. |
| 2004/0221004 | A1 | 11/2004 | Chalfin et al. |
| 2007/0083574 | A1 | 4/2007 | Garin, Jr. et al. |
| 2007/0223483 | A1 | 9/2007 | Huang et al. |
| 2007/0233994 | A1 | 10/2007 | Ye |
| 2007/0300120 | A1 | 12/2007 | Kim et al. |
| 2008/0162514 | A1 | 7/2008 | Franks et al. |
| 2008/0201751 | A1 | 8/2008 | Ahmed et al. |
| 2009/0031092 | A1 | 1/2009 | Tsumura |
| 2009/0303999 | A1* | 12/2009 | Guguen et al. ............. 370/392 |
| 2010/0235701 | A1 | 9/2010 | Choo |
| 2010/0262711 | A1 | 10/2010 | Bouazizi |
| 2010/0304730 | A1 | 12/2010 | Huang et al. |
| 2011/0078249 | A1 | 3/2011 | Blocksome et al. |
| 2011/0093437 | A1* | 4/2011 | Sampathkumar ............ 707/649 |
| 2011/0096828 | A1 | 4/2011 | Chen et al. |
| 2011/0103377 | A1 | 5/2011 | Hua et al. |
| 2012/0079001 | A1 | 3/2012 | Chincisan |
| 2012/0079076 | A1* | 3/2012 | Chincisan .................. 709/219 |
| 2012/0079323 | A1 | 3/2012 | Chincisan |
| 2012/0081267 | A1 | 4/2012 | Sirpal et al. |
| 2012/0081268 | A1 | 4/2012 | Sirpal et al. |
| 2012/0081269 | A1 | 4/2012 | de Paz |
| 2012/0081270 | A1 | 4/2012 | Gimpl et al. |
| 2012/0081271 | A1 | 4/2012 | Gimpl et al. |
| 2012/0081280 | A1 | 4/2012 | Schrock et al. |
| 2012/0081289 | A1 | 4/2012 | Sirpal et al. |
| 2012/0081292 | A1 | 4/2012 | Sirpal et al. |
| 2012/0081293 | A1 | 4/2012 | Sirpal et al. |
| 2012/0081302 | A1 | 4/2012 | Gimpl et al. |
| 2012/0081303 | A1 | 4/2012 | Cassar et al. |
| 2012/0081304 | A1 | 4/2012 | Sirpal et al. |
| 2012/0081305 | A1 | 4/2012 | Schrock |
| 2012/0081306 | A1 | 4/2012 | Sirpal et al. |
| 2012/0081307 | A1 | 4/2012 | Sirpal et al. |
| 2012/0081308 | A1 | 4/2012 | Sirpal |
| 2012/0081309 | A1 | 4/2012 | Sirpal et al. |
| 2012/0081310 | A1 | 4/2012 | Schrock |
| 2012/0081311 | A1 | 4/2012 | Sirpal et al. |
| 2012/0081312 | A1 | 4/2012 | Sirpal et al. |
| 2012/0081313 | A1 | 4/2012 | Sirpal et al. |
| 2012/0081314 | A1 | 4/2012 | Sirpal et al. |
| 2012/0081315 | A1 | 4/2012 | Sirpal |
| 2012/0081316 | A1 | 4/2012 | Sirpal et al. |
| 2012/0081317 | A1 | 4/2012 | Sirpal et al. |
| 2012/0081318 | A1 | 4/2012 | Sirpal et al. |
| 2012/0081319 | A1 | 4/2012 | Gimpl et al. |
| 2012/0081322 | A1 | 4/2012 | Sirpal et al. |
| 2012/0081323 | A1 | 4/2012 | Sirpal et al. |
| 2012/0081397 | A1 | 4/2012 | de Paz |
| 2012/0081398 | A1 | 4/2012 | Sirpal et al. |
| 2012/0081399 | A1 | 4/2012 | Sirpal et al. |
| 2012/0081400 | A1 | 4/2012 | Schrock |
| 2012/0081401 | A1 | 4/2012 | Sirpal et al. |
| 2012/0081403 | A1 | 4/2012 | Sirpal et al. |
| 2012/0081854 | A1 | 4/2012 | Sirpal et al. |
| 2012/0083319 | A1 | 4/2012 | Sirpal et al. |
| 2012/0084673 | A1 | 4/2012 | Sirpal et al. |
| 2012/0084674 | A1 | 4/2012 | Visosky |
| 2012/0084675 | A1 | 4/2012 | Sirpal et al. |
| 2012/0084676 | A1 | 4/2012 | de Paz |
| 2012/0084677 | A1 | 4/2012 | Sirpal et al. |
| 2012/0084678 | A1 | 4/2012 | Sirpal et al. |
| 2012/0084679 | A1 | 4/2012 | Sirpal et al. |
| 2012/0084680 | A1 | 4/2012 | Gimpl et al. |
| 2012/0084681 | A1 | 4/2012 | Cassar |
| 2012/0084682 | A1 | 4/2012 | Sirpal et al. |
| 2012/0084686 | A1 | 4/2012 | Sirpal et al. |
| 2012/0084687 | A1 | 4/2012 | Sirpal et al. |
| 2012/0084693 | A1 | 4/2012 | Sirpal et al. |
| 2012/0084694 | A1 | 4/2012 | Sirpal et al. |
| 2012/0084698 | A1 | 4/2012 | Sirpal et al. |
| 2012/0084699 | A1 | 4/2012 | Sirpal et al. |
| 2012/0084700 | A1 | 4/2012 | Sirpal et al. |
| 2012/0084701 | A1 | 4/2012 | Sirpal et al. |
| 2012/0084706 | A1 | 4/2012 | Sirpal et al. |
| 2012/0084709 | A1 | 4/2012 | Sirpal |
| 2012/0084710 | A1 | 4/2012 | Sirpal et al. |
| 2012/0084712 | A1 | 4/2012 | Gimpl et al. |
| 2012/0084714 | A1 | 4/2012 | Sirpal et al. |
| 2012/0084715 | A1 | 4/2012 | Sirpal et al. |
| 2012/0084716 | A1 | 4/2012 | Sirpal et al. |
| 2012/0084718 | A1 | 4/2012 | Gimpl et al. |
| 2012/0084719 | A1 | 4/2012 | Sirpal et al. |
| 2012/0084720 | A1 | 4/2012 | Sirpal et al. |
| 2012/0084721 | A1 | 4/2012 | Gimpl et al. |
| 2012/0084722 | A1 | 4/2012 | Cassar et al. |
| 2012/0084723 | A1 | 4/2012 | Reeves et al. |
| 2012/0084724 | A1 | 4/2012 | Sirpal et al. |
| 2012/0084725 | A1 | 4/2012 | Sirpal et al. |
| 2012/0084726 | A1 | 4/2012 | Sirpal et al. |
| 2012/0084727 | A1 | 4/2012 | Sirpal et al. |
| 2012/0084739 | A1 | 4/2012 | Sirpal et al. |
| 2012/0105363 | A1 | 5/2012 | Sirpal et al. |
| 2012/0110486 | A1 | 5/2012 | Sirpal et al. |
| 2012/0110497 | A1 | 5/2012 | Gimpl et al. |
| 2012/0117495 | A1 | 5/2012 | Sirpal et al. |
| 2012/0124490 | A1 | 5/2012 | Sirpal et al. |
| 2012/0135704 | A1* | 5/2012 | Gunasekara ............... 455/404.2 |
| 2012/0144323 | A1 | 6/2012 | Sirpal et al. |
| 2012/0174028 | A1 | 7/2012 | Sirpal et al. |
| 2013/0086293 | A1 | 4/2013 | Bosse |
| 2013/0210489 | A1 | 8/2013 | Jouin |
| 2013/0210494 | A1 | 8/2013 | Jouin |

FOREIGN PATENT DOCUMENTS

| | | |
|---|---|---|
| KR | 10-2006-0028961 | 4/2006 |
| KR | 10-2006-0028961 A | 4/2006 |
| KR | 10-0748900 | 8/2007 |
| WO | WO2009109069 * | 11/2009 ............. H04L 12/56 |

OTHER PUBLICATIONS

U.S. Appl. No. 13/571,668, filed Aug. 10, 2012, Jouin.
U.S. Appl. No. 13/571,724, filed Aug. 10, 2012, Jouin.
U.S. Appl. No. 13/571,829, filed Aug. 10, 2012, Jouin.
U.S. Appl. No. 13/571,951, filed Aug. 10, 2012, Jouin.
U.S. Appl. No. 13/572,133, filed Aug. 10, 2012, Jouin.
U.S. Appl. No. 13/187,026, filed Jul. 20, 2011, Chen.
"1G", Wikipedia, Printed at http://en.wikipedia.org/wiki/1G on Jun. 6, 2012, 2 pages.
"2G", Wikipedia, Printed at http://en.wikipedia.org/wiki/2G on Jun. 6, 2012, 4 pages.
"3G," Wikipedia, printed Jun. 6, 2012, 8 pages (found at http://en.wikipedia.org/wiki/3G).
"4G," Wikipedia, printed Jun. 6, 2012, 10 pages (found at http://en.wikipedia.org/wiki/4G).
"5G", Wikipedia, Printed at http://en.wikipedia.org/wiki/5G on Jun. 6, 2012, 3 pages.
"Bluetooth," Wikipedia, printed Jun. 8, 2012, 11 pages (found at http://en.wikipedia.org/wiki/Bluetooth).
"Everything You Need to Know About 4G Wireless Technology", Techspot Guides, printed at http://www.techspot.com/guides/272-everything-about-4g/, printed on Jun. 8, 2012, 4 pages.
"Global Positioning System," Wikipedia, last modified Jan. 14, 2013, 15 pages (found at http://en.wikipedia.org/wiki/Global_Positioning_System).

(56) References Cited

OTHER PUBLICATIONS

"Lapdock™ for Motorola Atrix," at http://www.motorola.com/Consumers/US-EN/Consumer-Product-and-Services/Mobile . . . , accessed Apr. 18, 2011, 1 page.
"Location-based service," Wikipedia, last modified, Jan. 7, 2013, 10 pages (found at http://en.wikipedia.org/wiki/Location-based_service).
"LTE Advanced," Wikipedia, last modified Dec. 24, 2012, 5 pages (found at http://en.wikipedia.org/wiki/LTE_Advanced).
"LTE (telecommunication)," Wikipedia, printed Jan. 15, 2013, 10 pages (found at http://en.wikipedia.org/wiki/3GPP_Long_Term_Evolution).
"Microsoft Outlook 2010 Product Guide," Microsoft, 2010, 65 pages.
"Moore's law," Wikipedia, printed Jan. 15, 2013, 11 pages (found at http://en.wikipedia.org/wiki/Moore's_law).
"Motorola ATRIX 4G Laptop Dock Review," at http://www.phonearena.com/reviews/Motorola-ATRIX-4G-Laptop-Dock-Review_id2667, Mar. 2, 2011, 6 pages.
"Pandora Radio," Wikipedia, printed Jan. 15, 2013, 7 pages (retrieved from http://en.wikipedia.org/wiki/Pandora_Radio).
"Reliability (computer networking)," Wikipedia, last modified Oct. 24, 2012, 2 pages (retrieved from http://en.wikipedia.org/wiki/Reliability_(computer_networking).
"Roaming Guard," CMI Technologies, Installation and User Manual Version 1.04, 2011, 8 pages.
"RootMetrics. The one true picture of carrier performance." RootMetrics, captured Dec. 22, 2011, 2 pages (retrieved from http://web.archive.org/web/20111222231550/http://www.rootmetrics.com/).
"Transmission Control Protocol," Wikipedia, last modified Jan. 14, 2013, 18 pages (retrieved from http://en.wikipedia.org/wiki/Transmission_Control_Protocol.
"User Datagram Protocol," Wikipedia, last modified Jan. 9, 2013, 6 pages (retrieved from http://en.wikipedia.org/wiki/User_Datagram_Protocol).
"Wi-Fi," Wikipedia, printed Jun. 6, 2012, 7 pages (http://en.wikipedia.org/wiki/Wi-Fi).
"Wireless HDMI," Wikipedia, last modified Sep. 24, 2012, 1 page (found at http://en.wikipedia.org/wiki/Wireless_HDMI).
"Wireless Standard: 4G," printed at http://www.nd.edu/-mhaenggi/NET/wireless/4G/, on Jun. 8, 2012, 6 pages.
Burns, C., "Motorola ATRIX 4G Laptop Dock Review," at http://androidcommunity.com/motorola-atrix-4g-laptop-dock-review-20110220/, Feb. 20, 2011, 5 pages.
Catacchio, Chad, "This smartphone has two huge screens . . . that rotate," The Next Web at http://thenextweb.com/asia/2010/10/07/this-smartphone-has-two-huge-screens-that-rotate/, Jul. 21, 2011, 2 pages.
Google images, accessed Apr. 18, 2011, 6 pages.
Google Search "wifi protocol stack", Printed at http://www.google.com/search?q=wifi=protocol+stack&hl=en&qscrl=1&nord=1&rlz=1T4 . . . on Jun. 8, 2012, 15 pages.
Harman03, "Kyocera Echo Dual-screen Android Phone," posted 4 weeks from Apr. 18, 2011, 3 pages.
Mitchell, "Wireless Standards—802.11b 802.11a 802.11g and 802.11n" About.com Guide, Printed at http://compnetworking.about.com/cs/wireless80211/a/aa80211standard.htm on Jun. 8, 2012, 2 pages.
Mok et al. "Location determination using WiFi fingerprinting versus WiFi trilateration," Journal of Location Based Services, Jun. 2007, pp. 145-159 (Abstract Only) (retrieved from http://dl.acm.org/citation.cfm?id=1451884).
Oraskari, "Bluetooth versus WLAN IEEE 802.11x" Product Modelling and Realization Group (PM&RG) Department of Computer Science and Engineering Helsinki University of Technology, jyrki.oraskari@hut.fi 37266J, 5 pages.
Ravi et al., "4G Mobile Broadband—LTE Network Architecture and Protocol Stack", International Journal of Research and Reviews in Ad Hoc Networks, vol. 1, No. 1, Mar. 2011, 8 pages.
Stein, S., "How does the Motorola Atrix 4G Lapdock compare with a laptop?" Crave—CNET, at http://news.cnet.com/8301-17938_105-20031251-1.html, Feb. 9, 2011, 7 pages.
Vilches, "Everything You Need to Know About 4G Wireless Technology", printed from www.techspot.com/guides/272-everything-about-4g/, Apr. 29, 2010, 12 pages.
Wikipedia, "Bandwidth (computing)", Printed at http://en.wikipedia.org/wiki/Network_bandwidth, on Jun. 6, 2012, 2 pages.
Wikipedia, "Bandwidth optimization", Printed at http://en.wikipedia.org/wiki/Bandwidth_optimization, on Jun. 6, 2012, 2 pages.
Wikipedia, "Bit rate", Printed at http://en.wikipedia.org/wiki/Bit_rate on Jun. 6, 2012, 8 pages.
Wikipedia, "IEEE 802.11", Printed at http://en.wikipedia.org/wiki/IEEE_802.11 on Jun. 8, 2012, 12 pages.
Wikipedia, "Measuring network throughput", Printed at http://en.wikipedia.org/wiki/Bandwidth_test on Jun. 6, 2012, 7 pages.
Wikipedia, "Network performance", Printed at http://en.wikipedia.org/wiki/Comparison_of_latency_and_throughput on Jun. 6, 2012, 7 pages.
Wikipedia "Protocol stack", Printed at http://en.wikipedia.org/wiki/Protocol_stack on Jun. 8, 2012, 4 pages.
Wikipedia, "Quality of service", Printed at http://en.wikipedia.org/wiki/Quality_of_service on Jun. 6, 2012, 11 pages.
Wikipedia, "Throughput", Printed at http://en.wikipedia.org/wiki/Throughput on Jun. 6, 2012, 7 pages.
Wikipedia "WiMAX", Printed at http://en.wikipedia.org/wiki/WiMAX on Jun. 6, 2012, 8 pages.
International Search Report for International (PCT) Patent Application No. PCT/US2011/052563, mailed Feb. 12, 2012 3 pages.
International Search Report for International (PCT) Patent Application No. PCT/US2011/052556, mailed Apr. 26, 2012 3 pages.
Official Action for U.S. Appl. No. 13/186,307, mailed Nov. 7, 2012 8 pages.
International Search Report for International (PCT) Patent Application No. PCT/US2011/052355, mailed Apr. 19, 2012 3 pages.
International Preliminary Report on Patentability for International (PCT) Patent Application No. PCT/US2011/052355, mailed Apr. 11, 2013 7 pages.
International Preliminary Report on Patentability for International (PCT) Patent Application No. PCT/US2011/052563, mailed Apr. 11, 2013 6 pages.
International Preliminary Report on Patentability for International (PCT) Patent Application No. PCT/US2011/052556, mailed Apr. 11, 2013 6 pages.
Official Action for U.S. Appl. No. 12/891,438, mailed Sep. 24, 2012 16 pages.
Official Action for U.S. Appl. No. 12/891,438, mailed Mar. 1, 2013 19 pages.
Notice of Allowance for U.S. Appl. No. 13/188,335, mailed Apr. 3, 2013 14 pages.
PCT International Search Report for PCT/US2011/052563, dated Feb. 10, 2012 from Korean Intellectual Property Office.
Official Action for U.S. Appl. No. 13/571,951 mailed Nov. 14, 2013, 9 pages.
Official Action for U.S. Appl. No. 13/572,133 mailed Nov. 19, 2013, 19 pages.
Official Action for U.S. Appl. No. 13/186,307, mailed May 23, 2013 10 pages.
Notice of Allowance for U.S. Appl. No. 13/186,307, mailed Oct. 9, 2013 8 pages.
Official Action for U.S. Appl. No. 12/891,438, mailed Sep. 18, 2013 18 pages.

* cited by examiner

DATA TRANSFER USING HIGH SPEED CONNECTION, HIGH INTEGRITY CONNECTION, AND DESCRIPTOR

BACKGROUND

In order to facilitate communication between computing devices, data may be transmitted between devices in a format that is comprehensible by both the sending and receiving devices. In this regard, protocols have been developed that enable communication between computing devices connected by way of a network or the Internet. These protocols provide a standardized format in which data may be sent over a network. Accordingly, data may be sent between computing devices on a network or over the Internet and be properly interpreted by the receiving computer. The most common set of protocols governing communication over or between networks is the Internet Protocol Suite (commonly referred to as TCP/IP).

The Internet Protocol Suite includes several layers that provide different functions at different levels of abstraction. These layers consist of the Application layer, the Transport layer, the Internet layer, and the Link layer. Within each of these layers, different protocols have been developed to facilitate communication between computing devices. For instance, within the Transport layer many protocols have been developed in order to format data for communication over a network such that the sending and receiving computer devices may properly direct the data to and from an appropriate application on each computer. These protocols may provide different features depending upon the nature and intended role of the protocol. For example, connection-oriented data stream support, reliability, flow-control, and error correction may be provided by protocols within the Transport layer. However, the feature set for each protocol may be different and may include or omit features to strike a balance between performance (e.g., data transfer rates) and reliability (e.g., data integrity at the receiving device). That is, a protocol tailored for high rates of data transfer generally includes fewer data reliability features, whereas protocols tailored for high reliability may include reliability features that may limit data transfer rates. Two popular and widely used transport layer protocols demonstrate this inherent balance between performance and reliability. These are the Transport Control Protocol (TCP) and the User Datagram Protocol (UDP).

TCP connections provide data transfers that help to ensure high data integrity at the receiving device, but generally provide slower data transfer speeds than speeds obtainable using a UDP connection. A TCP connection utilizes a positive acknowledgement with retransmission technique that requires an acknowledgment message to be exchanged between a receiving entity and a sending entity to confirm that each individual data packet sent from a sender to a receiver was in fact received at the receiver. If not received, the data packet is retransmitted until acknowledgement is received from the receiver. While this may help to ensure that the data being sent arrives in the correct order and may assist in ensuring data packet delivery, the high reliability of the TCP connection comes at a cost of speed. The acknowledgement messages exchanged between sender and receiver take time to transmit. In turn, these messages are exchanged during times that could otherwise be used for transferring data, thus limiting the overall transfer rate. For example, oftentimes delays in the order of seconds are required waiting for out of order messages or waiting for retransmission of a packet.

A UDP connection, on the other hand, provides high speed data exchange, yet may sacrifice features that help ensure the integrity of data received at a receiving entity. In this regard, data packets (i.e., datagrams) sent via a UDP connection are not subjected to acknowledgement or other integrity checks similar to those present in a TCP connection. Thus, the transfer rate of a UDP connection may be higher than that of a TCP connection. However, there may be no mechanism in a UDP connection to help ensure that the all data packets were received, that all data packets arrived in order, and that there was no corruption of data during the transfer. Rather, data is simply delivered to the Application layer in the form it was received. As such, UDP connections either rely on applications to perform integrity checks, or assume that such integrity is of lesser importance than the overall speed of data transport. In this regard UDP connections are valuable in certain applications such as Internet broadcasting, voice-over-IP (VoIP) transmissions, queries to the Domain Name System (DNS), streaming media applications such as IPTV, Trivial File Transfer Protocol (TFTP), online gaming, or other time sensitive communications where a loss in data integrity is preferable to a slow communication due to the time sensitive nature of the data.

In short, a UDP connection emphasizes speed at the cost of reliability, while a TCP connection emphasizes reliability at the cost of speed.

Other protocols been developed for data exchange that are tailored for particular applications. One example of such a tailored protocol is the BitTorrent protocol. BitTorrent allows for exchange of a relatively large amount of data without dominating the bandwidth of any one computing device participating in the data transfer. In this regard, a torrent file is obtained by a receiving computer that in turn uses the file to seek and download small portions of a target file from various locations in the network (often called seeds). In this regard, the torrent file directs the acquisition of data from a multitude of different sources. However, BitTorrent was developed in order to provide relatively low bandwidth usage which is spread across a large number of users in the network in order to transfer data. Additionally, transfers using the BitTorrent protocol may use existing transport protocols (e.g. TCP), and are thus subject to the limitations presented by such transport protocols. As such, the data transfer is often slow as the usage of any one user's bandwidth is relatively low.

SUMMARY

A first aspect of the present invention includes a method of transferring data between computing devices that are operable to communicate over an electronic network. The method includes sending data from a source device to a destination device using at least one high speed connection. Also, the method includes communicating a descriptor regarding the data from the source device to the destination device using at least one high integrity connection. Data received at the destination device is correlated to the descriptor received at the destination device. The method further includes modifying the descriptor to identify data received at the destination device and informing the source device of the identity of data not received by the destination device using the at least one high integrity connection. The method also includes resending data not received by the destination device from the source device to the destination device using the at least one high speed connection.

A second aspect of the present invention includes a computing device that is operable to communicate with other computing devices to perform a parallel data transfer. The computing device includes a microprocessor, a memory in operative communication with the microprocessor that is operative to store one or more files, a network communication device operative to communicate data packets to a remote device on a network using a high integrity connection and a high speed connection, and a parallel data transfer module in operative communication with the microprocessor and the network communication device. The parallel data transfer module is operable to receive a descriptor over the high integrity connection regarding blocks of data received over the high speed connection, update the descriptor file based on the blocks of data received over the high speed connection, and communicate the updated descriptor file over the high integrity connection using the network communication device.

A third aspect of the present invention includes a method for receiving data at a destination device from a source device. The method includes receiving data at the destination device from the source device over at least one high speed connection. Additionally, the method includes acquiring a descriptor at the destination device regarding the data from the source device over at least one high integrity connection. Data received from the source device is correlated at the destination device to the descriptor. The method also includes modifying the descriptor based on data received at the destination device over the high speed connection. In addition, the modified descriptor is sent to the source device and the destination device receives data that has been resent by the source device using the at least one high speed connection.

A fourth aspect of the present invention includes a method of sending data from a source device to a destination device. The method includes sending data from the source device to the destination device using at least one high speed connection. Additionally, the method includes transmitting a descriptor regarding the data from the source device to the destination device using at least one high integrity connection. Also, the method includes receiving, at the source device, a modified descriptor including the identity of data not received by the destination device using the at least one high integrity connection. The method includes resending, at the source device, data not received by the destination device to the destination device using the at least one high speed connection.

A number of feature refinements and additional features are applicable to any of the aspects presented herein. These feature refinements and additional features may be used individually or in any combination. As such, each of the following features that will be discussed may be, but are not required to be, used with any other feature or combination of features of the any of the aspects presented herein.

For instance, in one embodiment, the data may include a first portion of a file. The first portion may include a plurality of blocks. Additionally, the descriptor may include a file which contains a set of unique elements. Each unique element may correspond to a different one of the plurality of blocks. For example, the unique element may be a bit in the file. In an embodiment, the modifying may include toggling at least one bit in response to receipt of a corresponding block of the first portion at the destination device. In this regard, the informing may include transmitting the descriptor having toggled bits to the source device via the high integrity connection.

In another embodiment, the method may be repeated until each of the blocks in the first portion is received at the destination device. As such, the method may be repeated for a plurality of portions until all of the file is transferred.

In yet another embodiment, a plurality of parallel data transfer connections may be established. Each parallel data transfer connection may include a high speed connection and a high integrity connection, and each parallel transfer connection may be operable to perform a method to transfer a respective one of a plurality of portions of a file. Furthermore, a plurality of parallel data transfer connections may be established. Each parallel data transfer connection may include at least one high integrity connection and a plurality of high speed connections. The plurality of parallel high speed connections may be operable to perform a method as recited above in concert with the at least one high integrity connections to transfer a respective one of a plurality of portions of a file.

In another embodiment, the at least one high speed connection may employ a User Datagram Protocol (UDP). The at least one high integrity connection may employ a Transmission Control Protocol (TCP). Also, the source device may be a server and the destination device may be a client device. The client device may a handheld computing device (e.g., a smartphone, PDA, tablet computer, or the like). In addition, the source device and the destination device may both be servers.

In still further embodiments, the method may be executed as an application directly controllable by a user. Commands may be received from a user by at least one of a command line interface and a graphical user interface. The method may also executed as a service controllable by an application. The service may be controllable by way of at least one of an application programming interface, a script, and a remote procedure call. The method may be initiated by the source device or may be initiated by the destination device.

Any of the embodiments, arrangements, or the like discussed herein may be used (either alone or in combination with other embodiments, arrangements, or the like) with any of the disclosed aspects. Any feature disclosed herein that is intended to be limited to a "singular" context or the like will be clearly set forth herein by terms such as "only," "single," "limited to," or the like. Merely introducing a feature in accordance with commonly accepted antecedent basis practice does not limit the corresponding feature to the singular (e.g., indicating that a data transfer protocol includes "the high speed connection" alone does not mean that the data transfer protocol includes only a single high speed connection). Moreover, any failure to use phrases such as "at least one" also does not limit the corresponding feature to the singular (e.g., indicating that data transfer protocol includes "a high speed connection" alone does not mean that the data transfer protocol includes only a single high speed connection). Use of the phrase "at least generally," "at least partially," or the like in relation to a particular feature encompasses the corresponding characteristic and insubstantial variations thereof. Finally, a reference of a feature in conjunction with the phrase "in one embodiment" does not limit the use of the feature to a single embodiment.

DETAILED DESCRIPTION

Figure 1:
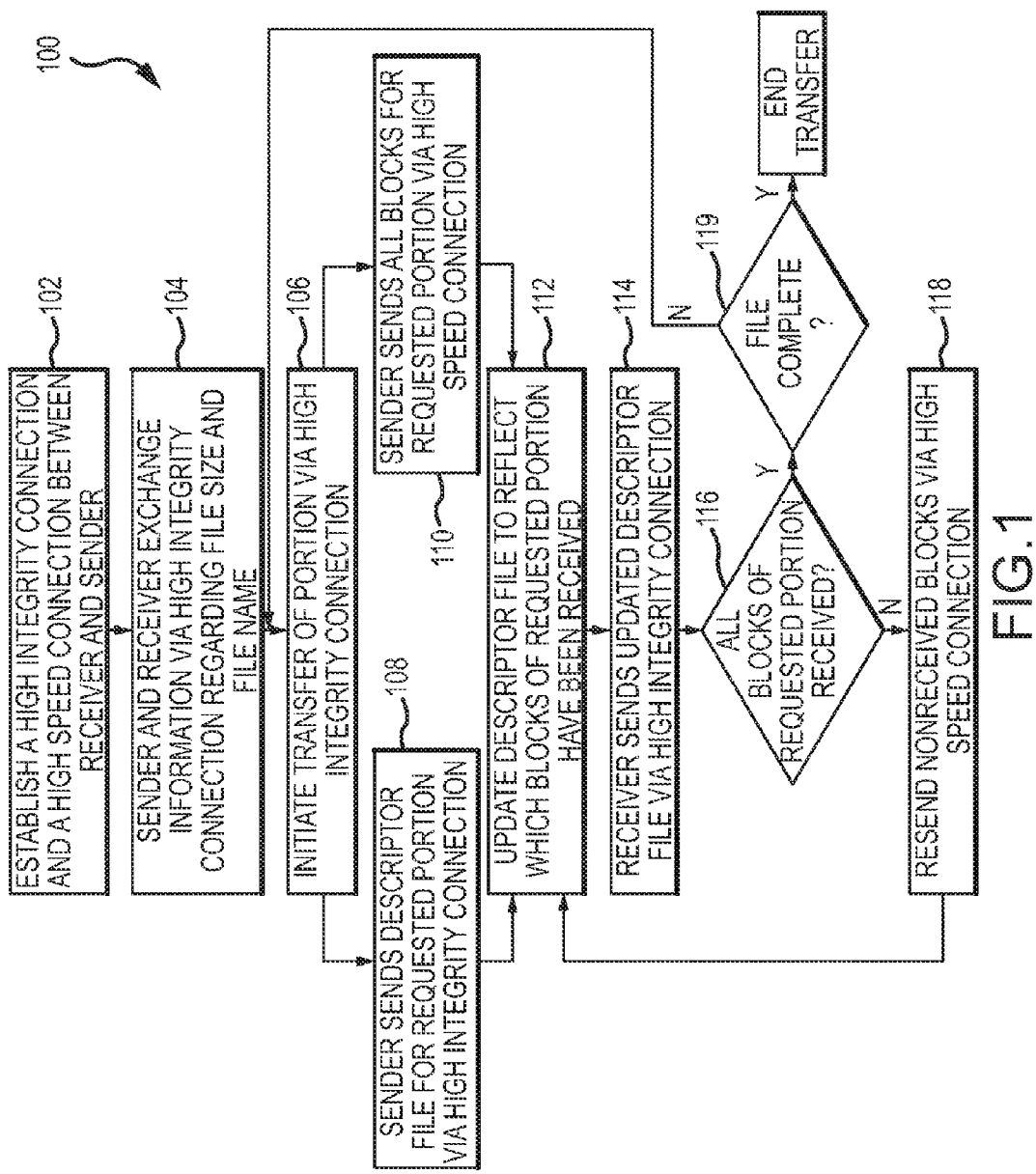
FIG. 1 is a flowchart of an embodiment of a protocol for parallel data transfer.

While the invention is susceptible to various modifications and alternative forms, specific embodiments thereof have been shown by way of example in the drawings and are described in detail herein. It should be understood, however, that it is not intended to limit the invention to the particular form disclosed, but rather, the invention is to cover all modifications, equivalents, and alternatives falling within the scope of the invention as defined by the claims.

The present disclosure is generally directed to parallel data exchange between computing devices. The exchange involves establishing at least one pair of connections that include a high speed connection and a high integrity connection. As used herein, each one of the high speed and high integrity connections may be judged relative to the other. That is, the high speed connection may be capable of data transfer speeds at least greater than the high integrity connection, and the high integrity connection may provide at least greater data reliability than the high speed connection. In one particular embodiment, the high speed connection utilizes a UDP protocol and the high integrity connection utilizes a TCP protocol.

The high integrity connection may be a side channel that is used to communicate descriptor data regarding the status of data transferred over the high speed connection. As such, while the high integrity connection may provide slower data transfer rates than the high speed connection, the amount of data communicated over the high integrity connection may be small compared to the amount of data communicated over the high speed connection.

During a data transfer, the majority of the data exchanged between a sender and receiver may be exchanged over the high speed connection. The high integrity connection may be used to exchange information used to provide data integrity features typically not available using the high speed connection.

FIG. 1 depicts an embodiment of one such protocol 100 for parallel data transfer between a sender (i.e., a source device) and receiver (i.e., a destination device). The protocol 100 may include establishing (102) a high speed and a high integrity connection between the receiver and the sender. In one particular embodiment, the high speed connection may be a UDP connection and the high integrity connection may be a TCP connection.

The protocol 100 may further include the sender and receiver exchanging (104) information via the high integrity connection. This information may include information regarding a file name and a file size of a file to be transferred from the sender to the receiver. Additionally, the receiver may, based on the exchanged file information, allocate an appropriate amount of memory at the receiver device to accommodate the file as will be discussed further below. As this exchanged information may comprise only metadata regarding the information to be exchanged via the high speed connection, the amount of data exchanged via the high integrity connection may be small compared to the amount of data to be exchanged via the high speed connection.

Figure 11:
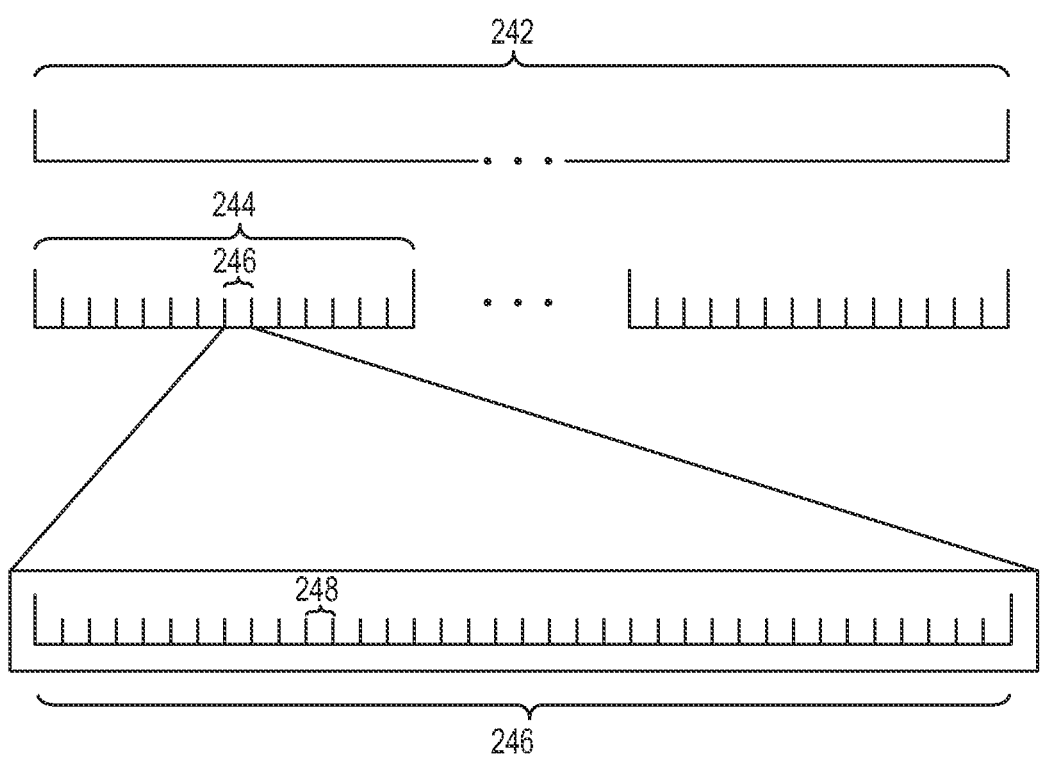
FIG. 11 is a graphical representation of an embodiment of the division of a file into superblocks, portions, and blocks.

With additional reference to FIG. 11, a graphical representation of the division of a file into small pieces is shown. A file 242 is represented as a line segment, wherein the length of the line segment is representative of the amount of data comprising the file 242. The file 242 may in turn be divided into a number of superblocks 244. Each of the superblocks may in turn be divided into portions 246. Each of the portions 246 may be divided into a number of blocks 248. Each of the blocks 248 may be transmitted over the high speed connection as a single data packet. Thus, each block 248 may be provided with header data corresponding to the protocol used for the high speed connection. Furthermore, each portion may have associated with it a descriptor file. The descriptor file may have a bit corresponding to each block 248 in a portion 246. The relationship between blocks 248 and descriptor files will be discussed further below. Additional data regarding the file such as the number of superblocks 244 to be exchanged, the number of portions 246 per superblock 244, and the number of blocks 248 per portion 246 may also be exchanged at step 104 of FIG. 1.

The protocol 100 may include the receiver and/or sender initiating (106) the transfer a portion of a superblock via the high integrity connection. For instance, in order to initiate (106) the data transfer, the receiver may request the first portion of the first superblock. In another embodiment, the sender may initiate a transfer of the first portion of the superblock. Thus, the initiation of a transfer of a portion may originate at the sender or receiver.

In any regard, the protocol may include sending (108) a descriptor file for the portion to be transferred via the high integrity connection. The descriptor file may include a number of unique elements. Each unique element may correspond to a different one of the blocks to be sent for the portion. In one embodiment, the descriptor file is a 32 bit word, such that the descriptor file corresponds to 32 blocks of data that comprise one portion of a superblock. In this regard, each bit is a unique element. Alternative embodiments may include that the unique element is a larger portion of the file, such as a byte or other portion of the file.

The sender may send (110) the blocks of the portion from the sender to the receiver via the high speed connection. It will be understood that because the blocks are sent via the high speed connection, there may few or no features to help ensure reliable data delivery provided by the high speed connection. For example, a data checksum may be provided (e.g., in a UDP header) to ensure the contents of each individual block are accurately received, however no mechanism may be provided to help ensure all blocks are received or to ensure the blocks are received in the correct order.

As such, the descriptor file may be updated (112) to reflect whether blocks send by the sender were received at the receiver. Updating the descriptor file may include toggling bits that correspond to blocks that are received at the receiver. Thus, the updated descriptor file may include bits indicating the files that have been received at the receiver and files that have yet to be received at the receiver.

As an example, for a portion comprising six blocks of data, a corresponding six bit descriptor file may be sent (108). As such, upon initial receipt of the descriptor file at the receiver (i.e., prior to receiving any blocks via the high speed connection) the descriptor file may be populated with zeros indicating no blocks have been received. Thus, the descriptor file may be represented as [000000]. After having received the first block (block 0), third block (block 2), and fourth block (block 3), the descriptor file may be updated (112) to reflect which of the blocks were received. Thus, the updated descriptor file may be represented as [101100]. When all blocks have been received, the descriptor file may be represented as [111111].

Returning to FIG. 1, the receiver may send (114) an updated descriptor file via the high integrity connection to the receiver. At 116, the updated descriptor file may be used to determine which blocks of the requested portion of the request superblock have been received. If not all blocks of the requested portion have been received the sender may resend (118) the blocks that were not received based on the updated descriptor file.

The process may then loop such that the descriptor file is updated (112) based on any newly received blocks, the non-received blocks are sent (114) via the high integrity connection to the sender, and it is determined (116) whether all blocks of the requested portion have been received. This loop may be repeated until all blocks of the requested portion have been received at the receiver or until the process times out (e.g., performs a predetermined number of loops without any blocks being received by the receiver or without receiving an updated descriptor file).

If all blocks of the requested portion have been received, the protocol 100 may proceed to determining (119) if the entire file transfer has been completed. If all portions of all superblocks (e.g., the entire file) have been received, the transfer may be ended. If there are remaining portions of superblocks to be received, the process may loop such that the transfer of the next portion of the superblock is initiated (106). Alternatively, the transfer of the first portion of the next superblock may be initiated (106). The protocol 100 may be repeated until all portions of all superblocks into which the file was divided have been transferred.

Figure 2:
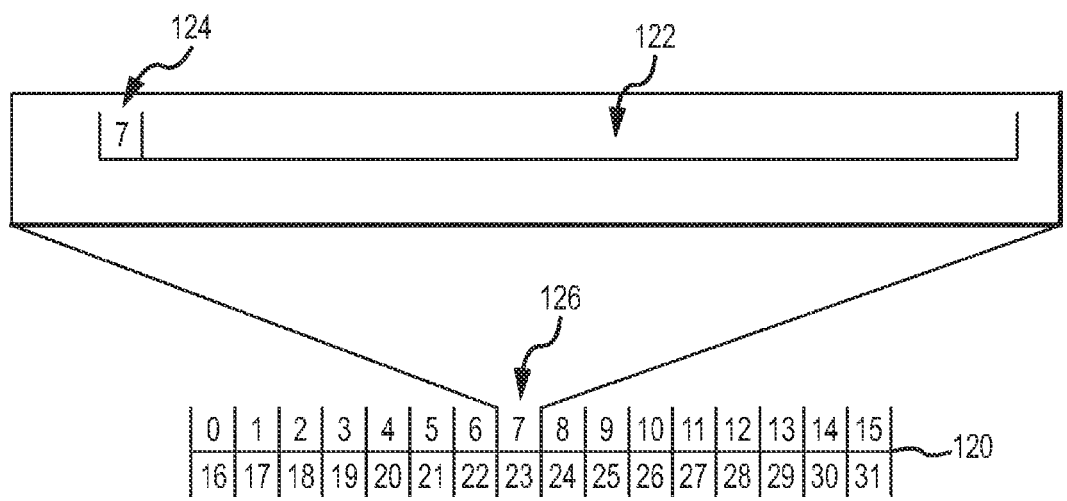
FIG. 2 is a schematic representation of an embodiment of a descriptor file and one corresponding block.

With additional reference to FIG. 2, a graphical representation of a descriptor file 120 and a block 122 is shown. For illustrative purposes, a 32 bit descriptor file 120 is depicted. Thus, in this particular embodiment, each superblock may be divided into portions having 32 blocks. However, a descriptor file with a different number of bits may be provided such that each portion of the superblock contains a corresponding number of bits (e.g., a 20 bit descriptor file would result in portions of 20 blocks, etc.). That is, the number of bits used for the descriptor file may determine the size of the portions into which each superblock is divided. Prior to being sent over the high speed connection, each block 122 may be appended with an identifier 124. The identifier 124 may be used to correlate the block 122 with the appropriate corresponding bit 126 for the descriptor file 120. As depicted, block 7 of the portion is shown corresponding to bit 7. Thus, the identifier 124 may be used to correlate block 7 with bit 7 when block 7 is received at the receiver. Bit 7 may be toggled (i.e., a 0 value changed to a 1 value) upon receipt of block 7 at the receiver. In this regard, the status of whether each block of the portion being transferred has been received may be tracked using the descriptor file 120. This is further illustrated with reference to FIG. 3.

Figure 3:
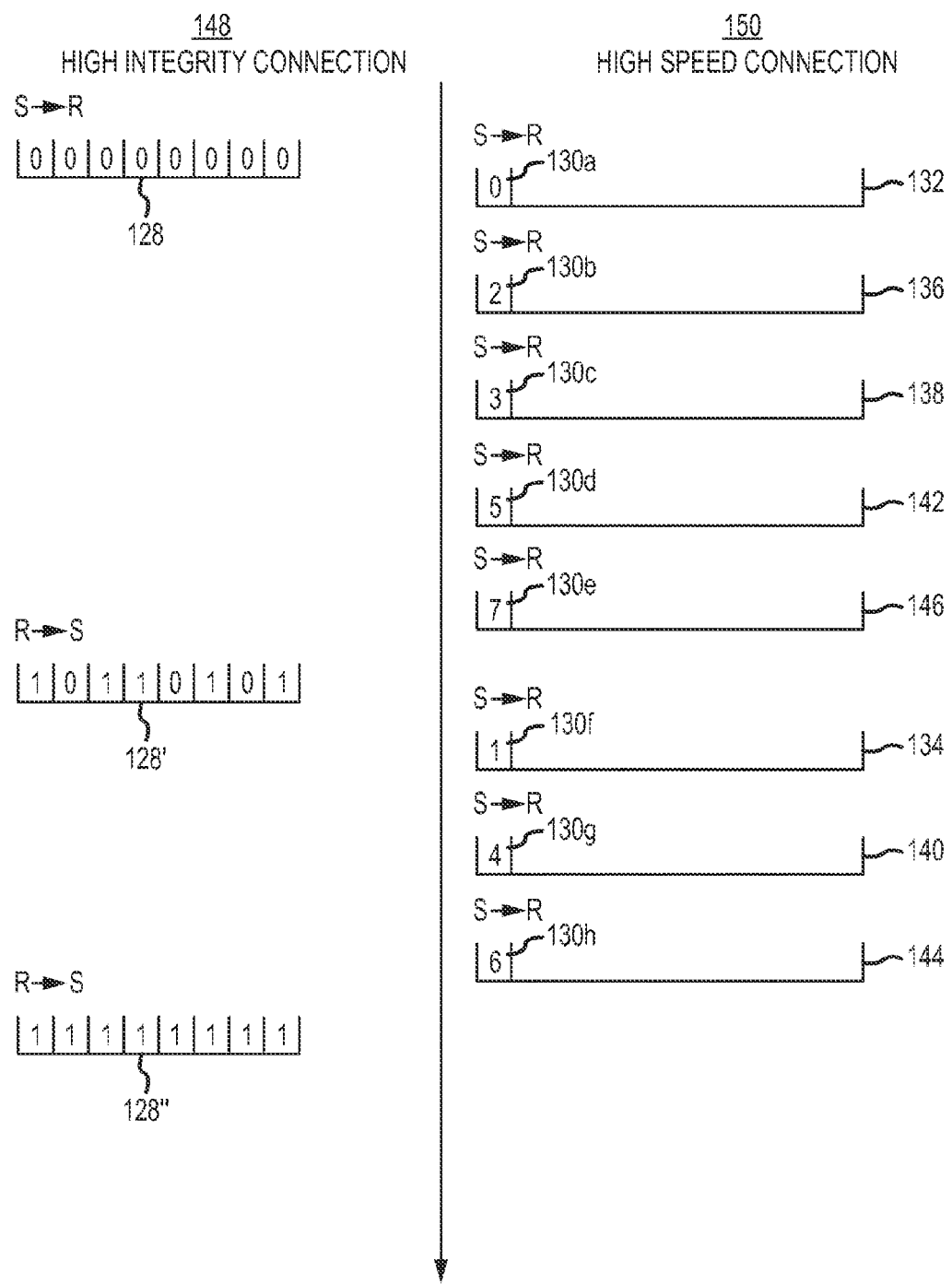
FIG. 3 is a graphical representation of a descriptor file being updated in response to receipt of blocks according to an embodiment of parallel data transfer.

FIG. 3 is a graphical representation of the status of a descriptor file 128 and corresponding blocks (132-146). Transfers between sender and receiver via a high integrity connection 148 are depicted in the left column, and transfers between sender and receiver via a high speed connection 150 are depicted in the right column. In the depicted embodiment, an eight bit descriptor file 128 is initially sent from the sender to the receiver over the high integrity connection 148. Each one of the eight bits of the descriptor file 128 is populated with a zero to indicate that none of the eight blocks (132-146) corresponding to the descriptor file 128 has been received at the receiver. Subsequently, block 0 132, block 2 136, block 3 138, block 5 142, and block 7 146 may be sent via the high speed connection 150 and received at the receiver. Each of the blocks (132-146) may include an identifier (130a-130h). The respective identifiers (130a-130h) may be used to correlate each of the blocks (132-146) to a corresponding one of the bits of the descriptor file 128.

It may be the case that all eight blocks (132-146) are sent via the high speed connection 150; however, due to network conditions or other factors, some blocks may not all be received at the receiver. In this regard, the descriptor file 128 may be updated with respect to the received blocks. This updated descriptor file is designated with a single prime (128'). The bits associated with block 0 132, block 2 136, block 3 138, block 5 142, and block 7 146 in the updated descriptor file 128' have been populated with ones to indicate in these blocks were in fact received. The updated descriptor 128' may then be transmitted via the high integrity connection 148 to the sender. Based on this received updated descriptor file 128', the sender may resend the non-received blocks (i.e., block 1 134, block 4 140, and block 6 144). Block 1 134, block 4 140, and block 6 144 may subsequently be received via the high speed connection 150. As such, the descriptor file 128' may again be updated. This updated descriptor file is designated with a double prime (128"). Thus, the updated descriptor file 128" indicates all blocks have been received (i.e., all bits are set to one). The updated descriptor file 128" may then be sent via the high integrity connection 148 to the receiver. Thus, the receiver is notified that all blocks have been received at the receiver and that the transfer of the portion corresponding to the descriptor file 128 is complete.

Thus, blocks of data corresponding to a bit in a descriptor file may be transferred between machines. Each group of blocks correlated to the same descriptor file may comprise a portion. Blocks may have a predetermined size. For example, in one embodiment, each block may have about 1440 bytes or less. Blocks may be sized such that the data of the block, the identifier correlating the block to a descriptor file, and any header information added to the block to facilitate communication via a protocol (e.g., a UDP header) does not render the block too large to transmit using the selected protocol. In one embodiment, each superblock may have associated with it 1000 blocks. As briefly discussed above, the number of portions of blocks within a superblock may be determined by the number of bits of the descriptor file. That is, a portion may comprise all the blocks correlated to a common descriptor file. For instance, in an embodiment, where a superblock has 1000 blocks, and a 20 bit descriptor file is utilized, the superblock may have 50 portions. For each of these portions, each bit of a 20 bit descriptor may have a corresponding block. Thus, during a transfer, each portion may be sent via the process described above with reference to FIGS. 1 and 3. The transfer of a complete file may entail dividing the file into superblocks, dividing the superblocks into portions, and correlating each block of a portion to a bit in a descriptor file to facilitate transfer.

Additionally, while the foregoing has generally discussed a single instance of a parallel transfer using a high speed connection and a high integrity connection, it is also contemplated that a plurality of parallel transfers using the method described above may be carried out simultaneously. In this regard, a plurality of pairs of high speed and high integrity connections may be established between a sender and receiver. For instance, in an embodiment utilizing a UDP protocol for the high speed connection and a TCP protocol for the high integrity connection, a unique port number may be used for each UDP and TCP connection comprising a high speed connection and high integrity connection pair. In one embodiment, TCP Port 10600 is used as a listening port for the sending device and TCP port 10601 is used as a listening port for a remote procedure call to the protocol, as will be described further below. UDP Ports 10610-10640 and 10650-10670 may be used for sending and receiving device pairs. In one embodiment, up to 16 parallel transfer connections may be established, each parallel transfer connection may include a high speed connection and a high integrity connection. More parallel transfer connections could be provided; however the available bandwidth of a device may preclude the effective use of more than 16 parallel connections.

The use of multiple parallel transport connections simultaneously may facilitate even higher data transfer rates as each parallel transfer connection may work to simultaneously transfer a portion of a superblock as described above. In this regard, each parallel transfer connection may be tasked with transferring one portion of the superblock. After completing the transfer of a portion of the superblock, each connection may be tasked with transfer of another portion of the superblock until all portions have been transferred. Once the superblock has been completely transferred, the parallel transfer connections may be tasked with transfer of another superblock.

For example, one embodiment may include three parallel transfer connections operative to transfer five portions of a superblock. In this regard, the superblock may be divided into portions A, B, C, D, and E. The first parallel transfer connection may begin transferring portion A, the second parallel transfer connection may begin transferring portion B, and a third parallel transfer connection may begin to transfer portion C. The parallel transfer connection that first completes the transfer of a portion may begin transferring the next portion (portion D). The next parallel transfer connection that completes a transfer may be tasked with downloading portion E. In the event a parallel transfer connection completes the transfer of a portion and no remaining portions of the superblock are available, the parallel transfer connections may be idled until all portions of the superblock have been downloaded. Once all portions of the superblock have been downloaded, the process may proceed to a second superblock wherein the foregoing may be repeated. Thus, when a parallel transfer connection completes a transfer of a portion, the next portion to be transferred may be assigned to the available parallel transfer connection. However, once all portions have been transferred or are actively being transferred by another parallel transfer connection, any free parallel transfer connections may be idled upon completion of the transfer of the superblock.

In this regard, the transfer process may be implemented on a superblock-by-superblock basis such that each superblock is fully transferred prior to initiating the transfer of another superblock. Thus, each superblock of the file may be transferred in this manner until the entire file has been transferred.

Figure 12A:
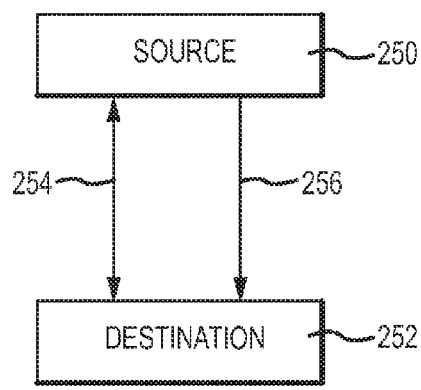
FIGS. 12A-D are graphical representations of different embodiments of a parallel data transfer protocol having different numbers of connections.
Figure 12B:
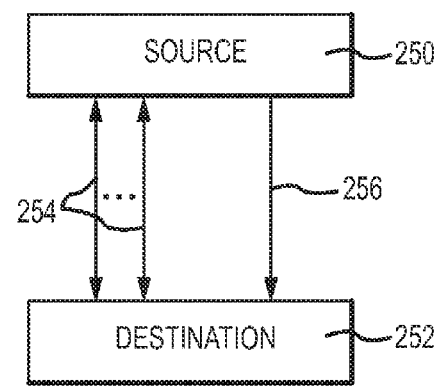

Additionally, while the foregoing has described a parallel transfer connection including a single high integrity connection and a single high speed connection, further embodiments may be provided where additional high speed or high integrity connections are established for each parallel transfer connection. For instance, a graphical representation of various embodiments of parallel transfer connections are shown in FIGS. 12A-D. In each of the embodiments depicted, a parallel transfer connection is established between a source device 250 and a destination device 254. As shown in FIG. 12A, a single high integrity connection 254 and a single high speed connection 256 is established. FIG. 12B shows a plurality of high integrity connections 254 and a single high speed connection 256. In this regard, multiple descriptors or portions of a single descriptor may be exchanged using the high integrity connections 254 to conduct a transfer as discussed above, while blocks are transferred over the single high speed connection 256.

Figure 12C:
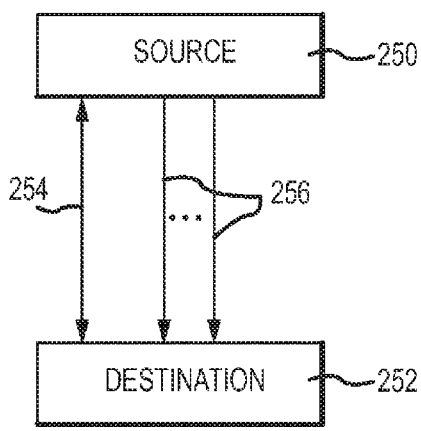
Figure 12D:
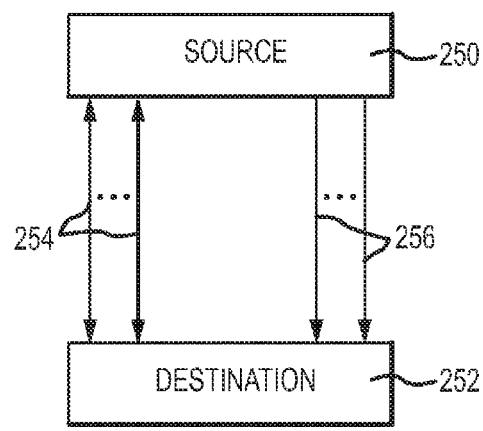

Additionally, FIG. 12C depicts a parallel transfer connection wherein a single high integrity connection 254 is provided along with a plurality of high speed connections 256. The high integrity connection 254 may be operative to transmit descriptor data between the source device 250 and the destination device 256 regarding blocks that have been transmitted/received over the plurality of high speed connections 256. In addition, FIG. 12D depicts an embodiment of a parallel transfer connection wherein a plurality of high integrity connections 254 and a plurality of high speed connections 256 are provided. In this regard, a parallel transfer connection may include more than one high speed connection 256 and/or high integrity connection 254 that may be used to carry out the transfer as described above.

Parallel transfer connections may process non-adjacent portions of a file simultaneously. By non-adjacent portions of a file, it is meant that portions of the file may be transferred out of order. Thus, the presently contemplated process of data transfer may provide a mechanism of ordering a received file despite individual blocks of the file being received at the receiver out of order.

For instance, upon initiation of a file transfer, the file name and file size may be provided. Thus, the receiver may be aware of the size of the file. This, coupled with known information regarding the size and number of superblocks, portions, and blocks may be used to determine the appropriate location in memory of a given amount of received data. Accordingly, despite receiving blocks of a file out of order, a receiver may be able to write a block to an appropriate location in memory such that once all blocks have been received, the file is identically reproduced at the receiver.

For instance, a file having two or more portions may be transferred such that the two or more portions are transmitted simultaneously using two or more parallel transfer connections. Thus, blocks may be received simultaneously that belong to different portions of the file. Thus, the receiver may be operative to write the received block into memory at an appropriate location despite the receipt of the blocks out of order. For example, this may be accomplished by writing to an absolute position associated with the correct location of a particular block or may be accomplished by using a known offset from a known reference in the memory (e.g., the location in the memory associated with the beginning of the file)

Figure 4A:
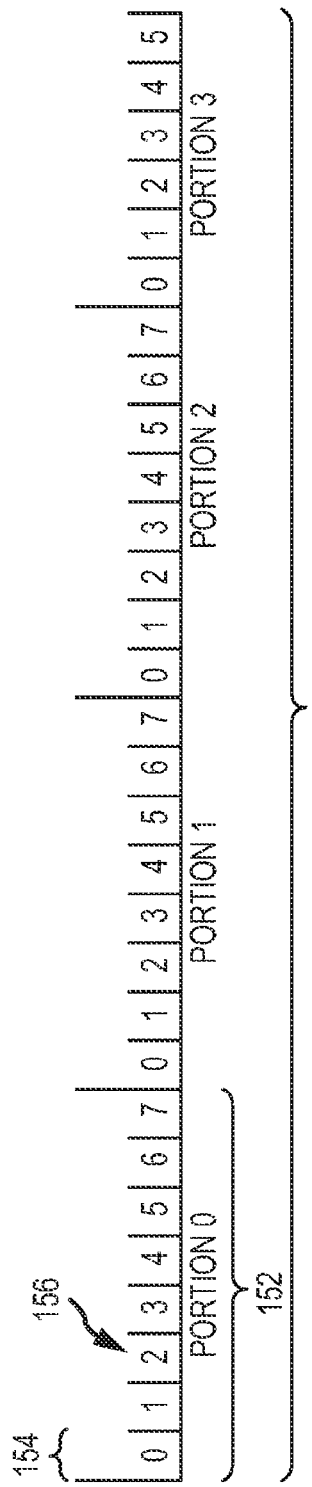
FIGS. 4A-B depict a graphical representation of an embodiment of physical memory in a computing device.
Figure 4B:
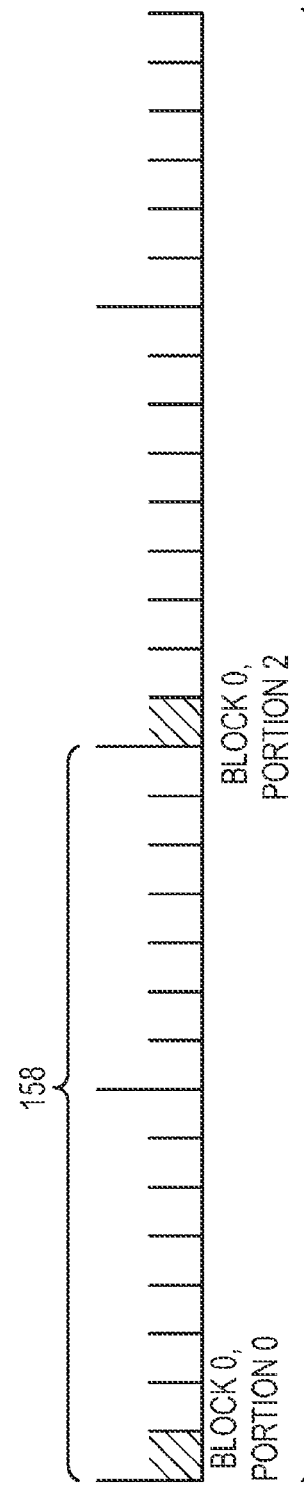

A graphical representation of one embodiment writing non-adjacent data into a memory based on an offset is shown in FIGS. 4A-B. The receiver, upon initiation of the data transfer, may receive information regarding the total size of the file to be received and the size of each block and each portion. Thus, the receiver may allocate the appropriate amount of local memory 188 to store the file that is to be received. When receiving the file information, the receiver may determine if enough memory exists at the receiver. If insufficient memory is available to store the completed file, the receiver may report an error either locally or to the sender.

As shown in FIG. 4A, the receiver may have received information indicating the received file was to be 30 blocks in length. Furthermore, the receiver may receive information regarding the block size 154 and the portion size 152. With further reference to FIG. 4B, two simultaneous transfers may occur (e.g., using a first parallel data connection and a second parallel data connection). The blocks being received are shown in cross hatch. As shown, the first block of the first portion (portion 0, block 0) may be received at the same time as the first block of the third (portion 2, block 0). Rather than simply consecutively writing this data into memory as received, the receiver may determine the appropriate location of each portion based on identification information associated with the block. For instance, portion 0, block 0 may simply be written in the first allocated space in memory as it is the first block of data in the file. However, portion 2, block 0 may be written into memory at a location corresponding to an offset 158. In this case, the offset 158 is an amount of memory corresponding to 16 blocks, as 16 blocks of data appearing the in file before the appropriate location for portion 2, block 0. Thus, the receiver may begin writing portion 2, block 0 into memory according to the offset value 158, thus allowing the blocks coming before portion 2, block 0 to be written in each blocks corresponding location when received. Each block of data received by the receiver may be written into the appropriate location in memory in this fashion.

Additionally, data transfers using parallel transfer connections may support recovery mechanisms in the event that the transfer of a file fails due to any one of a number of failure conditions. For example, a recovery file may be generated to track information regarding the status of the transfer. The recovery file may be updated with information regarding the status of the transfer at regular intervals (e.g., every 1 second). As such, in the event of an interruption of the transfer, the recovery file may contain information that allows for recovery of the transfer from a known good portion of the transfer. In this regard, various types of transfer interruptions (e.g., network unavailability, lack of network reliability, system failures, power interruptions, etc.) may be successfully recovered from a known good portion of the transfer without completely restarting the transfer.

As discussed briefly above, the transfer of a file may be accomplished on a superblock-by-superblock basis. That is, the transfer may fully complete the transfer of a superblock prior to initiating the transfer of another superblock. This may facilitate a reduction in the size of the recovery file required to track the status of the transfer. In one embodiment, the recovery file may include data regarding the status of the transfer of individual blocks (e.g., whether the block has successfully been transferred). For very large files (e.g., on the order of a terabyte or more), the recovery file may be excessively large because such a large file may include a large number of blocks. However, using superblock-by-superblock processing, a recovery file may be provided for each superblock. Thus, the recovery file may be significantly smaller by storing data regarding the identity of the particular superblock corresponding to the recover file and the status of blocks within that superblock. As a superblock may contain only a relatively small portion of blocks in relation to the full file, the recovery file may be relatively small by only storing data regarding which particular superblock the recovery file corresponds to and the status of blocks within the particular superblock.

A file that is transferred may divided into discrete blocks as described above. Thus, in the event the data transfer is interrupted during transmission of a block, the recovery file may contain information regarding which superblock is currently being transferred and which of the blocks of that superblock have been successfully transmitted. As the transfer may be carried out in a superblock-by-superblock fashion, a determination may be made that all superblocks prior to the currently transmitting superblocks have been successfully transferred. Thus, all previously transferred superblocks and all successfully transferred blocks of the current superblock may be retained in memory in the event of a failure condition. Any data comprising a partial block may be discarded. Thus, when transmission is available again (e.g., due to changed network conditions, restoration of system power, etc.), the transmission may restart by requesting any non-received blocks of the currently transmitting superblock based on information contained in the recovery file. As such, when the sender and receiver are again capable of transferring data, the process may continue such that any data belonging to a fully transferred block is retained despite the interruption in the transfer of the file. Any partial data received for a block may not be kept, and any bits corresponding to the partially transferred blocks may be set to indicate the blocks have yet to be received. This allows for retention of the partially downloaded portion up to the last full received block. Thus, an interruption to the transfer does not require completely restarting the file transfer, which in the case of large files could add significant time to a transfer that is interrupted.

Furthermore, in addition to the ability to transfer multiple portions simultaneously via multiple parallel transfer connections, in one embodiment, multiple superblocks may be transferred simultaneously using multiple connections as well. Each process transferring a superblock may be independent such that an independent recovery file is generated for each transfer of a superblock.

A configuration value may be provided (e.g., in a configuration file) to dictate one or more parameters used to determine if the process should be suspended (e.g., due to network fidelity problems or system issues). For instance, the configuration file may include a threshold value for a predetermined number of requests by the receiver that may be made without receiving a block before the transfer is suspended. In another example, a threshold value for the bitrate (i.e., bits per second) of a transfer may be provided in the configuration file. The average bitrate for the process may be calculated after the transfer of each superblock and compared to the threshold value. In the event the calculated average bitrate for the superblock drops below the threshold value, the process may be suspended. Alternatively, the average bitrate may be calculated for the transfer of each block or each portion to determine whether the average bitrate has fallen below the threshold value. Furthermore, in an embodiment, the instantaneous bitrate may be calculated and compared to the threshold bitrate to determine whether the process should be suspended. In yet another embodiment, a user may manually suspend a transfer. Further alternate examples of ways in which the process may be suspended are provided below. In any regard, once the process has been suspended, the process may remain suspended for a predetermined amount of time (e.g., as determined by a user definable value), until a user reinitiates the process, or at some other predetermined event.

In one embodiment of the presently contemplated transfer, when sending blocks over the high speed connection, the sender may transmit each of the requested blocks on a cycle such that the cycle is repeated until all blocks of the portion have been received at the receiver. Contemporaneously, the sender and receiver may be exchanging information via the high integrity connection regarding which blocks have been received at the receiver (i.e., through scrutinizing the returned descriptor file). Upon receipt of each block at the receiver, the descriptor file may be updated and sent to the sender. As the descriptor file will be a relatively small amount of data, the time required to exchange descriptor files is relatively short. Thus, once the sender receives the updated descriptor file indicating a block has been received, each block indicated as received may stop being sent in the cycle of blocks being sent. This may continue until all blocks have been received.

Additionally, the number of cycles the sender completes may be limited by a configuration value or may be adaptable based on the transfer of previous portions. For example, a configuration value may dictate that each block for a first portion is attempted to be transmitted four times (e.g., the sender will complete the send cycle of all blocks four times). If additional cycles are required, the process may return an error message and suspend the transfer.

Alternatively or additionally, each portion transferred may be used to dynamically adapt the number of cycles available for the next portion. For instance, once the first portion is completely transferred, the number of attempts in sending the block may be adapted for the next portion. For instance, if all blocks were received at the receiver (as determined at the sender by monitoring returned descriptor files) after two cycles, the number of cycles available for the next portion may be reduced (e.g. to 3 or 2 cycles rather than the original 4 cycles). Furthermore, if additional cycles are necessary to transfer the first portions, the number of attempts per block for the next portion may be increased (e.g., to 5 or more cycles prior to timing out). Furthermore, a maximum value for the number of cycles may be established such that if the number of attempts per block reaches or exceeds the maximum value, the process may enter an error state and be suspended.

For example, in an embodiment where an eight bit descriptor file is exchanged, the receiver may request the eight corresponding blocks of the portion. After the sender has sent all eight blocks (e.g., completed one cycle), the status of the descriptor file may indicate that all but the seventh block was received. Thus, the next cycle may include sending only the remaining block that has yet to be received (i.e., the seventh block). After sending the seventh block again (e.g., competed another cycle), the sender may still not have received a descriptor file indicating receipt of the seventh block. Thus, the seventh block is sent by the sender until receipt is confirmed by way of the descriptor file or a predetermined number of attempts have been made.

Alternatively, the timing associated with returning an updated descriptor file from the receiver to the sender indicating which blocks have yet to be received at the receiver may be dictated according to a configuration value (e.g., a value in a configuration file). Default values may be set or the configuration for individual transfers may be modified as desired by a user. For instance, the receiver may request all blocks associated with a received descriptor file as described above. The receiver may then wait for a defined duration as determined by the configuration file prior to returning an updated descriptor indicative of non-received blocks. The duration the receiver waits may be dependent upon the number of blocks requested. As an example, for an eight bit descriptor, all eight corresponding blocks may be requested. The configuration file may dictate a certain wait period per the number of blocks requested, thus the total wait may be eight times the configuration value of wait time per block. Once the descriptor file is updated and the non-received blocks are requested, the wait time for updating or returning the descriptor file may correspond to the number of blocks requested. For instance, if all but three of the eight blocks were received, the new wait time associated with the request for the three remaining blocks may be three times the configuration value of wait time per blocks.

Alternative regimes for timing when the receiver updates the descriptor file may be employed. Examples of such regimes may include, but are not limited to, setting a threshold value of blocks to be received prior to updating the file or updating upon some other trigger event such as a received message.

Figure 5:
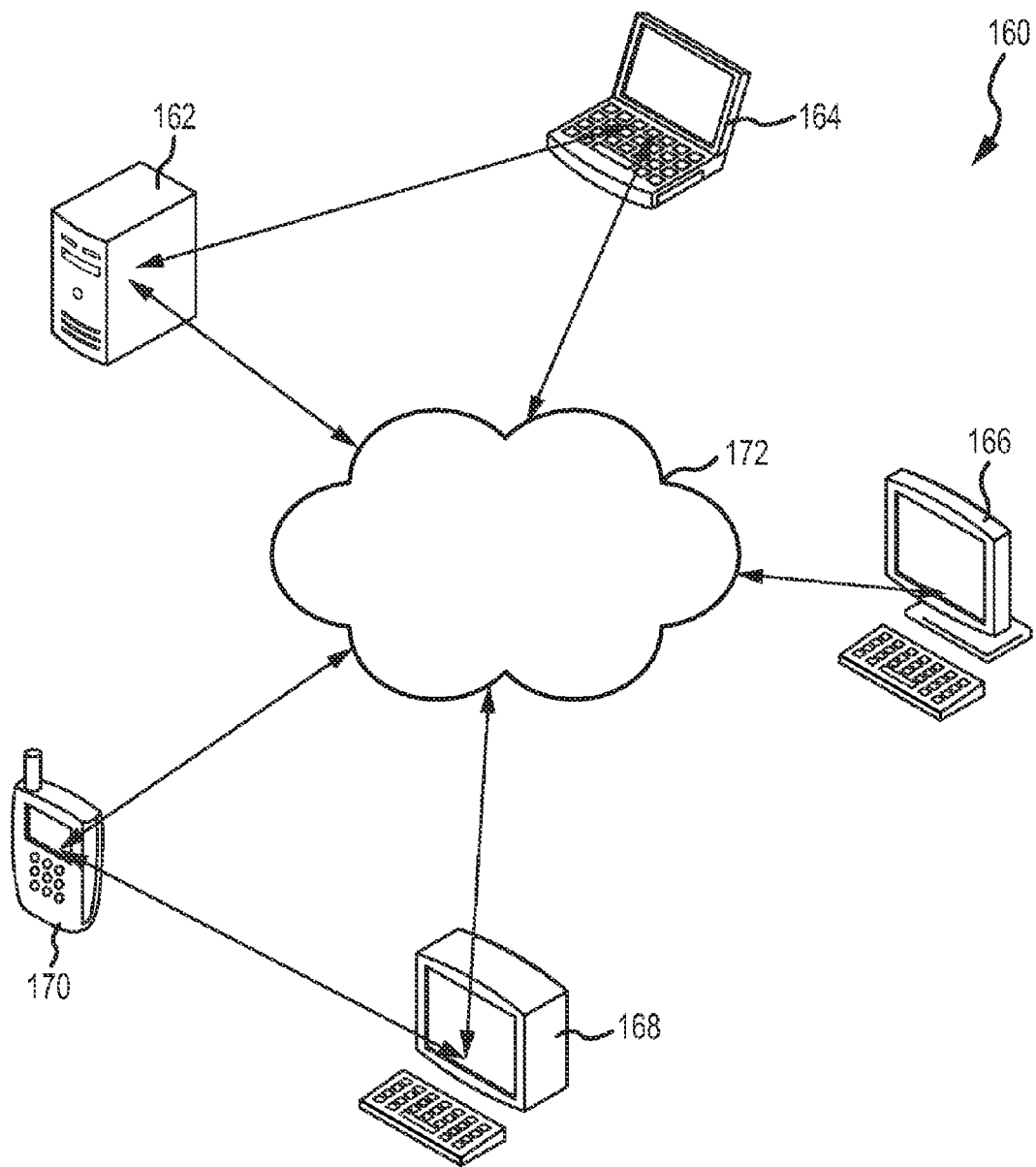
FIG. 5 depicts a schematic view of an embodiment of a system of computing devices in operative communication.

The foregoing may be used to transfer files between computing devices that are capable of communicating via a network or series of connected networks. One embodiment of such a system 160 capable of parallel data transfer is depicted in FIG. 5. The system 160 may include, but is not limited to, a number of computing devices including a server 162, a laptop computer 164, a desktop computer 166, a computer terminal 168, and a mobile computing device 170 (e.g., a cellular telephone, a smart phone, a tablet computer, a PDA, etc.). The computing devices of the system 160 may be in direct communication with each other; may communicate by way of a local area network, a wide area network, an Intranet, or the like; or may communicate via the Internet 172.

The use of a parallel data transfer according to the foregoing in the system 160 may facilitate a number of benefits. For example, large files may be exchanged between devices (162-170) at high speeds while providing for high data reliability. For example, where UDP and TCP connections are used, the speed of data transfer may approach those experienced using a UDP connection alone and may provide similar data reliability to that experienced using a TCP connection alone. Thus, the benefits of each protocol are maximized. In this regard, a large amount of data may be exchanged between devices (162-170) which allows for high speed connection and exchange of data between the devices (162-170).

Figure 6:
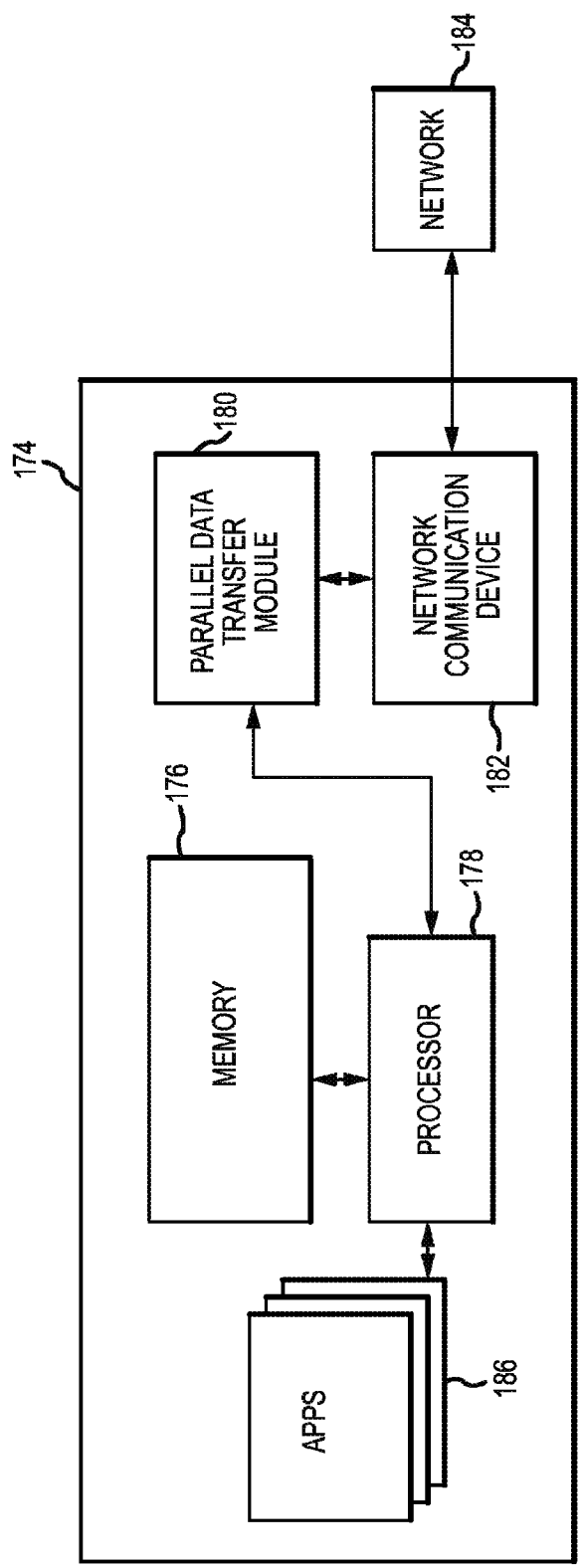
FIG. 6 is a schematic view of an embodiment of a computing device capable of performing high speed parallel data transfers.

FIG. 6 depicts a schematic representation of one embodiment of a device 174 for use in the system 160. The device 174 may include a memory 176 for storing data. The memory 176 may be in operative communication with a processor 178. The processor 178 may be able to access the memory 176 to both read data therefrom as well as write data thereto. Additionally, the device 174 may include a parallel data transfer module 180 in operative communication with the processor 178. The parallel data transfer module 180 may be hardware, software, firmware, or a combination thereof operative to direct communications according to the protocol described with reference to FIG. 1.

The device 174 may also include a network communications device 182 (e.g., a network card or the like) in operative communication with parallel data transfer module 180 that is in further communication with a network 184 for communicating to another computing device.

While not shown in FIG. 6, alternative embodiments may be provided wherein additional modules are provided, modules discussed above are combined, or additional communication is established between features. For example, the parallel transfer module 180 may be in direct operative communication with the memory 176. Additionally, the functionality discussed below may be accomplished using more or fewer modules than those described and shown in FIG. 6.

In addition, the device 174 may execute a number of applications 186. These applications may provide a variety of functions to communicate data to and receive data. The applications 186 may access the parallel data transfer module 180 to facilitate transfer of data as controlled by the applications 186. Alternatively, the parallel data transfer module 180 may be a standalone application directly controllable by a user (e.g., using a command line interface (CLI) or a graphical user interface (GUI)). In this regard, while not shown in FIG. 6, the device 174 may also have input devices (e.g., a keyboard, mouse, touch screen, or other input device) in order to allow interaction between the CLI or GUI and the user.

If accessed by another application, the parallel transfer module 180 may be accessible by way of a remote procedure call (RPC), may run as a Windows™ service existing in a component object model (COM+) environment or distributed component object model (DCOM) environment, may be controlled by a script, or may be controlled by the application in some other appropriate manner (e.g., some other object oriented environment). In any regard, the parallel data transfer module 180 may be accessed to utilize the parallel data transfer module 180 to facilitate transfers of files via the network 184. For example, a user may directly control the parallel data transfer module 180 by way of commands entered into a CLI or a GUI. Alternatively, the service may be controlled using a script, application programming interface (API), RPC, or the like to allow an application to utilize the parallel data transfer protocol 180 to transfer data.

Table 1 illustrates a number of functions which may be used in conjunction with the parallel data transfer module 180. For instance, the functions listed in Table 1 may be received from a CLI of the computing device 174. Each of the functions presented in Table 1 may also correspond to a feature provided by a GUI that allows for a simplified graphical interface so a user may access and control the parallel data transfer module 180. Alternatively, the commands listed in Table 1 may be utilized by way of an API, script, RPC, or the like such that applications 186 utilize the parallel data transfer module 180 to accomplish tasks or features associated with the applications 186. As used in Table 1, "[in]" represents an input parameter provided by a user, whereas "[out]" represents an output received in response to a command. Additionally, "string" is used to represent the form of the parameter is a character string and "long" is a long integer.

TABLE 1

| Function Name | Parameters | Description |
| --- | --- | --- |
| Version(SCODE scode, [out]long* version) | scode - unused parameter version - output parameter representing the version of the protocol. | Returns version information regarding the version of the protocol being employed (e.g., the version of the executable file or .dll file executing protocol. |
| Retry([in]string jid, [in]long time) | jid - job identifier (e.g., string value) representing a job. This parameter is returned as an output by one off Put/Get functions appearing later in this table. time - numerical parameter that sets the time to retry a failed job due a network error. | Sets the retry time for current job to a non-default value. The default retry time for the job is the time specified in the configuration file. |
| BandWidth([in]string jid, [in]long bps) | jid - job identifier. bps - desired bit rate (e.g., bits per second) | Sets the bit rate for a specified job when the job is still queued. After a job has started to transfer, the function has no effect. The entered bps value overwrites the default value taken from the configuration file. |
| Stop([in]string jid) | jid - job identifier | Stops the transfer for the specified job. The job is then placed in the history container and it can be restored at a later date. |
| Resume([in]string jid) | jid - job identifier | Restores a specified job that has been stopped by Stop function. Also can restore a job that has been abandoned by a network failure. |
| StopAll( ) | | Stop all in-progress transfers. |
| Put([in] string file, [in]string server, [in]long connections, [out]string* jid) | file - fully qualified windows file name, including drive path and file name of file to be transferred (e.g., C:\system\fff.ini). server- universal server destination location for file including server, and path (e.g., \\server\D:\dest\) connections - number of simultaneous parallel transfer connections to perform the transfer. This number should not exceed the number of processors for the machine jid - returned output value of the job identifier corresponding to the requested transfer. | Starts a transfer from local machine to server machine for the file, trying to copy the file on server location. The method returns a unique job identifier for the job that is performing the transfer. The job id can be used later perform actions on the job. If the destination folder is missing the service will create it. The transfer may use a TCP connection to initiate transfer. |
| Get([in]string dir, [in] string serverfile, [in]long connections, [out]string* jid) | dir - fully qualified destination folder for requested file (e.g., C:\system\). serverfile - universal server location and file for the file to be transferred (e.g., | Starts a transfer from server machine to local machine. The function returns a unique identifier for the job that is performing the transfer. |

TABLE 1-continued

| Function Name | Parameters | Description |
|---|---|---|
| | \\server\D:\dest\file.ext). connections - number of parallel transfer connections used for the transfer. jid - returned value of unique job identifier | The job identifier can be used later perform actions on the job. If the local destination folder is missing the service will create it. The transfer may use a TCP connection to initiate the transfer. |
| Debug([in]long bits) | bits - numerical value for the debug flags as follows: 0 - no debug 1 - debug for information 2 - debug for warnings 3 - debug for information and warnings 4 - debug for errors 5 - debug for information and errors 6 - debug for errors and warnings 7 - debug for information, warnings and errors | Changes the default value for debugging log as was set in configuration file. |
| Throttle([in]string jid, [in] ethr) | jid - job identifier ethr - enumeration value for throttling the job. Following values are accepted: eLOW - sets the transfer rate to ¼ the value from configuration file per job eMED - sets the transfer rate to ½ the value from configuration file per job eHIGH - sets the transfer rate to the value from configuration file per job | Pre-establishes the transfer rate to values corresponding those explained in the parameter column. |
| Priority([in]string jid, [in]long where) | jid - job identifier where - integer value used as follows: −1 - moves the job to the end of waiting queue 0 - moves the job to the top of waiting queue any other integer value will move the job to the position corresponding to the input value. If the target job is in progress, the command returns an error along with the error description. | Changes the job priority in the waiting queue by moving the target job to a desired position. If the job in the target position is in progress the function returns an error. |
| ShutDown( ) | | Shuts down the service. |
| UdpPut([in] string file, [in]string server, [out]string* jid) | file - fully qualified windows file name, including drive path and file name (e.g., C:\system\fff.ini) server - universal server location for including server, and path (e.g., \\server\D:\dest\) jid - returned value of unique job identifier | Starts a transfer from local machine to server machine for the file, trying to copy the file on server location. The method returns a unique identifier for the job that is performing the transfer. The job identifier can be used later perform actions on the job. If the destination folder is missing the service will create it. The transfer uses UDP. |
| UdpGet([in]string dir, [in] string serverfile, [out]string* jid) | dir - fully qualified destination folder (e.g., C:\system\) serverfile - universal server location and file for the file to be transferred (e.g., \\server\D:\dest\file.ext) jid - returned value of unique job identifier | Starts a transfer from server machine to local machine. The method returns a unique identifier for the job that is performing the transfer. The job identifier can be used later perform actions on the job. If the local destination folder is missing the service is creating it. The transfer uses UDP |

TABLE 1-continued

| Function Name | Parameters | Description |
| --- | --- | --- |
| Status([in]string jid, [in,out]JOB_STATUS* pjs) | jid - job identifier<br>pjs - input/output parameter that is populated with current status of the target job. JOB_STATUS structure is described below. The 'pjs' storage for the structure should be allocated by the caller. | Returns the status of targeted job. |
| StatusFirst( [in,out] JOB_STATUS* pjs)<br>StatusNext([in,out] JOB_STATUS* pjs) | pjs - input/output parameter that is populated with current status of the job. JOB_STATUS structure is described below. The 'pjs' storage for the structure should be allocated by the caller. | These functions are used to enumerate all the job statuses. When StatusNext passes the end of available jobs will return 'end of job' warning as a result S_CODE. |
| GetErrorDestription([in]long err, [out]string* desc) | err - numerical value of an error usually the one from JOB_STATUS structure<br>desc - error description. If an error code is an application error code the associated description is returned, otherwise the windows 32 error description is returned. If none of these matches an error code the returned value is an empty string; | Returns the error description for err error code. |
| Verify([in] string file, [in]string server, [in]long connections, [out]string* jid) | file - fully qualified windows file name, including drive path and file name (e.g., C:\system\fff.ini)<br>server - universal server location for including server, path, and filename (e.g., \\server\D:\dest\fff.ini)<br>connections - number of simultaneous connections to perform the verification. This number should not exceed the number of processors for the machine<br>jid - returned value of the job identifier | Checks the 2 files using MD5 and CRC algorithms. There is no data transferred between parties. |
| JOB_STATUS | Structure used to retrieve the job status. Structure members are:<br>remoteIP -- string 128 chars<br>remoteFile -- string 260 chars<br>localFile -- string 260 chars<br>taskid - GUID<br>ePutGet - numerical value of the job type, 0-put, 1-get, 2-verify, 3-command<br>connections -- number of connections used by the job<br>bUdp - 1 if the job uses UDP transfer, otherwise uses TCP<br>transferred -- number of bytes sent or received at the time of the call.<br>filesize -- total file size length in bytes<br>bps -- current bytes per second transfer rate, and after the job is finished the real bytes per second overall for the whole job up time.<br>Starttime -- time_t start time value. To interpret this value take a look at time_t and time functions in SDK<br>leftTime -- estimated left time for the job in seconds.<br>Uptime -- up time<br>eStatus -- enumeration value, E_STATUS with following values:<br>eQUEUED - waiting to be processed<br>eRESCHEDULED - waiting to be processed, and previously failed due a user Stop command or network error, | |

TABLE 1-continued

| Function Name | Parameters | Description |
|---|---|---|
| | eSTARTING - in the process to start the transfer. eWORKING - in process of transferring the file(s) eSTOPPING - in the process of completing the transfer, closing connections, and renaming the files. eFINSISHING - in the process of informing the parent application that the job is finid = shing. eFINSHED - job is waiting to be labeled as completed or eFAILED. eCOMPLETTED - job transfer went successfully with no errors. EFAILED - job finished with errors. See nError member for error code, and eventually call getErrorDecsription to find more information. nError - error code if any or 0 for no errors | |

In addition to the foregoing, the parallel data transfer module 180 may be a standalone application executing on the device 174 that is operative to control the transmission of files between the device 174 and another device in the network. One embodiment of a GUI 190 useful in controlling such an application is depicted in FIGS. 7-10.

Figure 7:
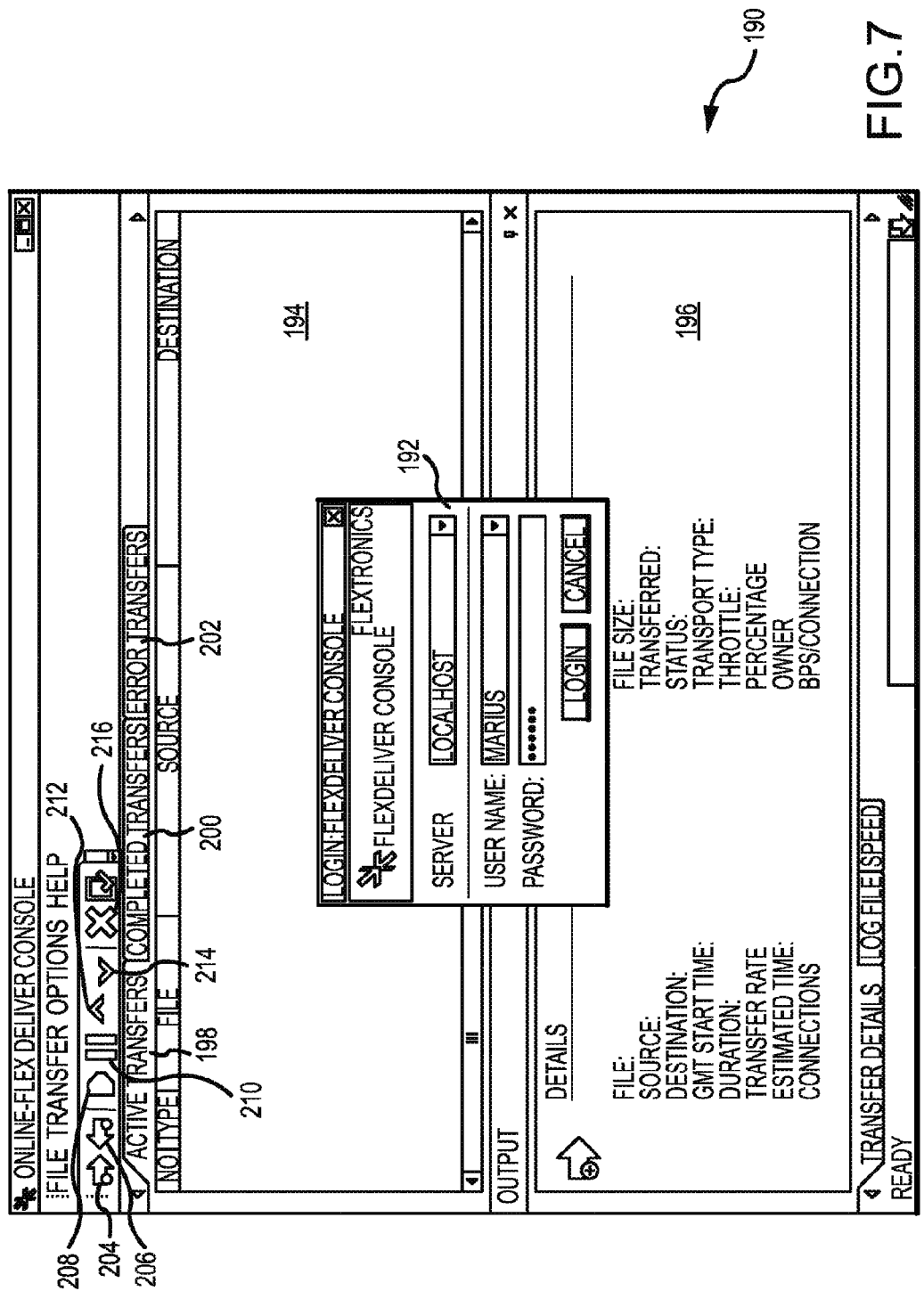
FIGS. 7-10 are screenshots of an embodiment of a graphical user interface for controlling a parallel data transfer module.

As can be seen in FIG. 7, an authentication dialog box 192 may be presented to a user. The authentication dialog box 192 may include a selection for a server to which a connection is requested. The authentication dialog box may further include fields for a username and password. Thus, access to the parallel data transfer module 180 may be limited based on username and password authentication. Also, in FIG. 7, the GUI 190 may include a transfer status pane 194 and a detail pane 196. The transfer status pane 194 may include three tabs. These tabs may be an active transfers tab 198, a completed transfers tab 200, and an error tab 202. In this regard, active transfers may be shown under the active transfers tab 198 in a list appearing in the transfer status pane 194. Completed transfers may appear in the completed transfer tab 200, and transfers that have experienced an error may be listed under the error tab 202. Details for a selected transfer may be shown in the detail pane 196.

Additionally, the GUI 190 may include a toolbar containing several buttons. For instance, a Put button 204 and a Get button 206 may be used to initiate Put commands and Get commands for file transfers as will be discussed in more detail with respect FIGS. 8 and 9. Additionally, a resume button 208 may be provided to allow a user to resume a suspended transfer or a transfer that has experienced an error. A suspend button 210 may be provided to suspend an active transfer. Also, a priority up button 212 and priority down button 214 may be provided to manipulate the order in which a selected transfer is to be completed. A stop all button 216 may be provided to suspend all active transport transfers.

Figure 8:
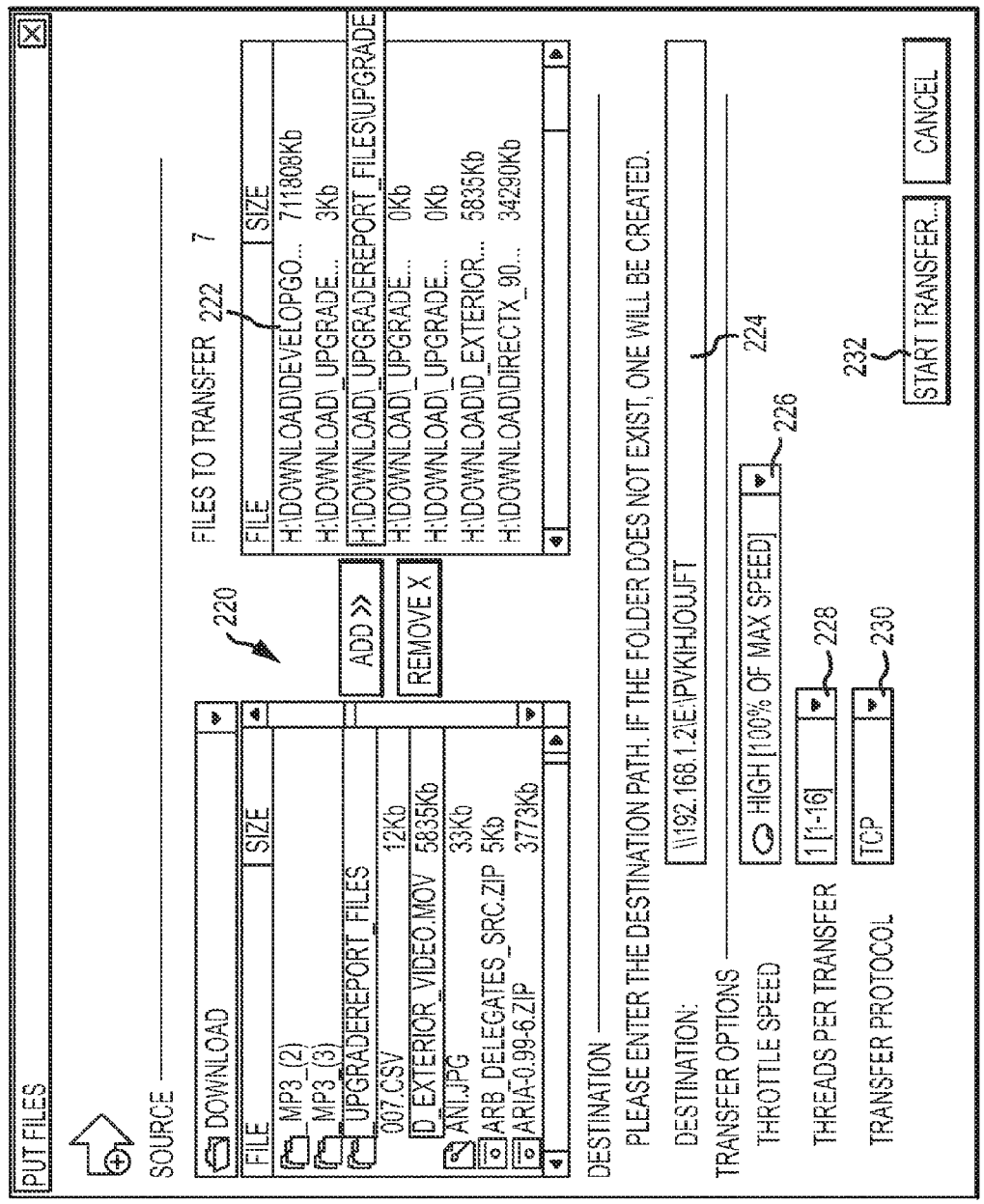
Figure 9:
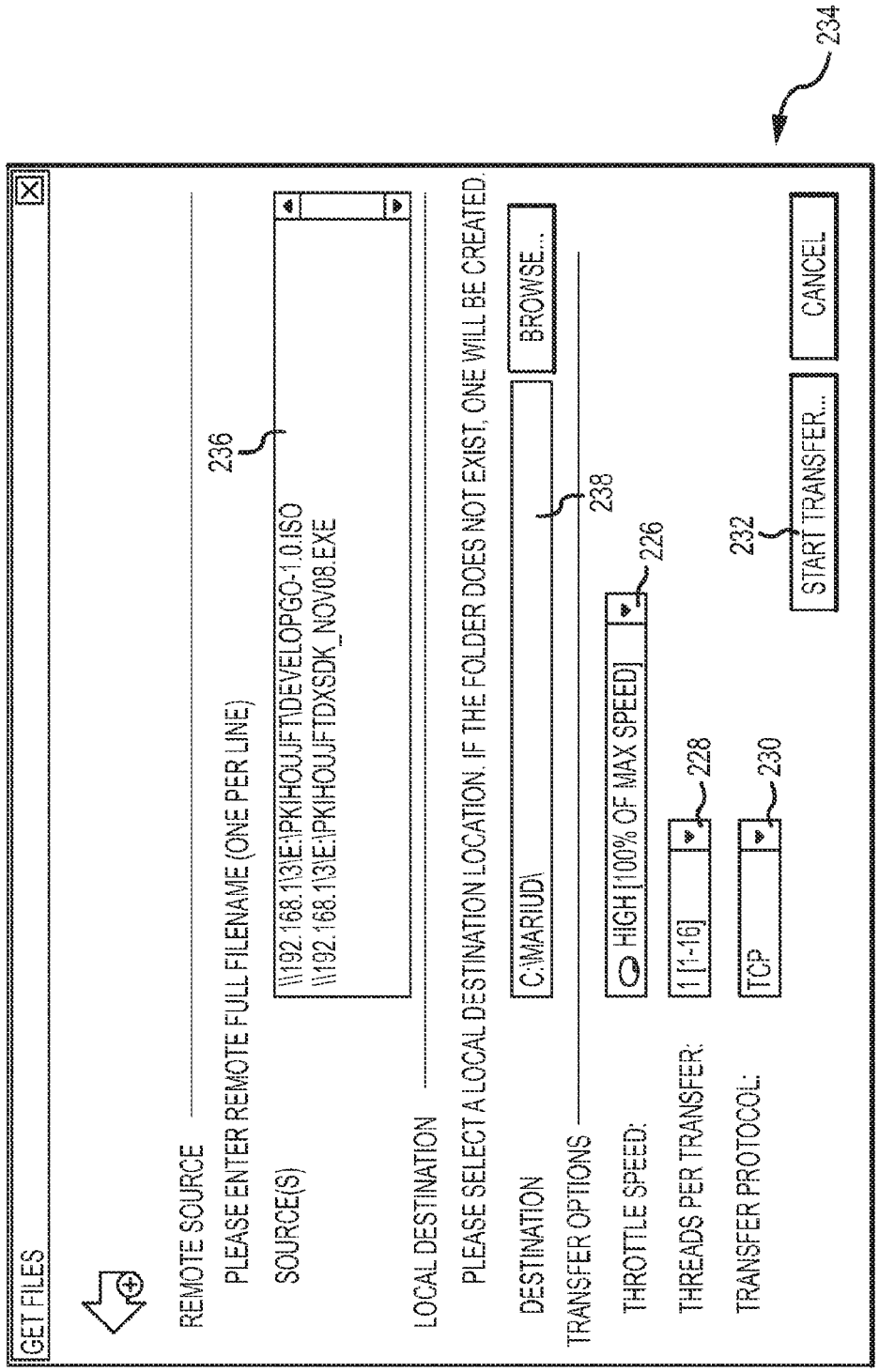

With additional reference to FIG. 8, a Put window 218 may be presented to a user after selecting the Put button 204. The Put command allows a user to initiate a transfer of a local file to a remote machine. The Put window 218 may include a file selector 220 that allows a user to browse a local source in order to select files to add to the selected file window 222. Additionally, a destination field 224 may be provided that allows a user to enter a remote destination for the file transfer. A number of transfer options are provided including a throttle selector 226 that allows the throttle speed to be selected for the transfer (e.g., 100% of max, 50% of max, 25% of max, etc.). Additionally, a thread selector 228 may provide a user the ability to select the number of threads (e.g., parallel data transfer connections) used to transfer a file. Additionally, a transfer protocol selector 230 may provided to selected protocol used to transfer the file. In this regard, the transfer protocol selector 230 may allow a user to select a transfer protocol used by a high speed connection and select a protocol to be used a high integrity connection.

A Get window 234 may be presented to a user upon selecting the Get button 206. The Get command may allow a user to select a file located remotely to be transferred to a local location. They Get window 234 may have a source file selector 236 that allows a user to select files on a remote source for transfer to the local machine. A local destination field 238 is provided that allows a user to specify the destination of the transfer. Additionally, the transfer options described above with respect the Put window 234 may also be presented in the gift window 218 to allow user to control these options with respect to a file transfer initiated as a Get command.

Figure 10:
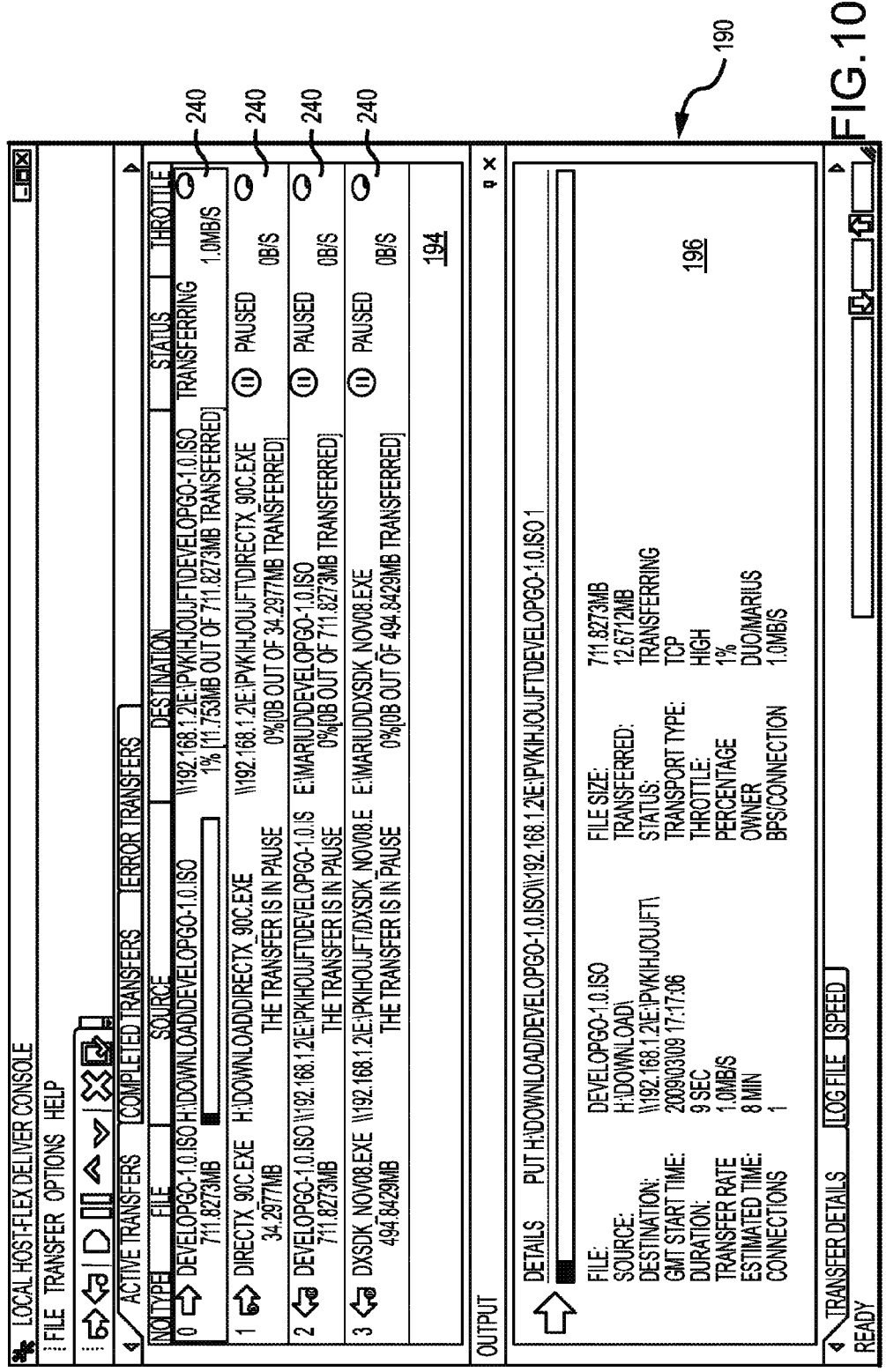

FIG. 10 depicts the GUI 190 during a transfer. A number of jobs 240 are listed in the transfer status pane 194. Job 0 is selected and details regarding this job are shown in the details pane 196. The details pane may include details regarding the source and destination of the file, the start time of the transfer, the duration of the transfer, the transfer rate, the estimated time remaining for the transfer, the number of connections (e.g., parallel data transfer connections) used, the overall file size, the amount of file that has been transferred, the status of the transfer, the type of transfer, the throttle setting, the percentage of the job complete, the owner the file, and the bit rate per connection. Additional data not displayed in the detail pane 196 may also be provided as the above is not an exhaustive list of details that may be provided. As can be appreciated, the transfer status pane 194 includes a number of transfers. Selecting a particular job 240 allows the details of the job to be shown in the detail pane 196 and also allows that job to be manipulated using the buttons described with respect to FIG. 7.

The foregoing may facilitate advantages over prior systems and protocols used for data exchange. Particularly, the foregoing may be useful when transferring large files between computing devices such that the large files are transmitted relatively quickly while assuring data integrity. Rather than utilizing a single protocol with the inherent advantages and drawbacks attendant to the protocol, the foregoing discussion regarding parallel data transfer allows the advantageous features of two protocols to be realized. In turn, the utilization of each protocol in a manner that allows for capitalization of the benefits thereof while mitigating the disadvantages of each protocol provides the consequent advantages of both protocols.

In addition to the foregoing disclosure, modifications or alternative approaches may be used without departing from the scope of the currently contemplated parallel data transfer. For instance, while the foregoing may describe a system where a destination device requests a portion of blocks from a source device, it will be understood that a system may be provided where a source device initiates a transfer of a portion of blocks. Further, it will be understood that these features may or may not correspond to Get and Put commands. That is, a Get command may involve a destination device requesting data portions, or may simply involve a destination device initiating a connection between the destination device and source device such that the source device initiates transfer of each portion. Similarly, a Put command may involve a source device initiating transfers over a connection (e.g., sending portions as a connection becomes available) or may involve a source device initiating a transfer such that the destination device requests initiating of transfers of portions over a connection.

Additionally, a parallel data exchange in accordance with the foregoing may be performed between a variety of computing devices without limit to those shown in FIG. 5. For instance, the parallel data exchange may occur between two servers, between a server and a remote computing device, between a server and a mobile computing device, etc. Furthermore, additional devices may be incorporated into the system in order to accomplish a portion of the process discussed above. For example, updated descriptors may be sent to a device which in turn communicates with the sender to notify the sender of the blocks that have yet to be received.

Further still, the examples presented herein with regard to superblock size, portion size, and block sizes are not limiting. Accordingly, any variation of sizes of superblocks, portions, and blocks may be used without limitation. Furthermore, one or more of these divisions of the file may not be provided. For instance, in one embodiment, a file may not be divided into superblocks, but rather the file may simply be divided into portions without grouping portions into superblocks.

Also, additional protocols may be provided other than those to establish TCP connections or UDP connections. Without limitation, some alternate protocols that may be used are Datagram Congestion Control Protocol (DCCP), Stream Control Transmission Protocol (SCTP), Resource Reservation Protocol (RSVP), Explicit Congestion Notification (ECN), Cyclic UDP, Fast and Secure Protocol (FASP), Reliable User Datagram Protocol (RUDP), or other Transport layer protocols. Additionally, known security protocols may be used in conjunction with the foregoing process. Also, additional data integrity checks may be conducted (e.g., redundant process checks for higher grade certainty of file integrity).

While the invention has been illustrated and described in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only the preferred embodiment and variants thereof have been shown and described and that all changes and modifications that come within the spirit of the invention are desired to be protected.

What is claimed is:

1. A method of transferring data between computing devices operable to communicate over an electronic network, comprising:
sending data from a source device to a destination device using at least one high speed connection;
communicating a descriptor regarding the data from the source device to the destination device using at least one high integrity connection, wherein the descriptor is at least two bits, wherein a first bit, of the descriptor, represents a first block of data of at least a portion of a superblock of data to be sent, and wherein a second bit, of the descriptor, represents a second block of data of at least the portion of the superblock of data to be sent;
correlating data received at the destination device to the descriptor received at the destination device;
modifying the descriptor to identify data received at the destination device;
informing the source device of the identity of data not received by the destination device using the at least one high integrity connection; and
resending data not received by the destination device from the source device to the destination device using the at least one high speed connection.

2. The method according to claim 1, wherein the data includes a first portion of a file, wherein the file is associated with the superblock of data.

3. The method according to claim 2, wherein the first portion includes two or more blocks of data.

4. The method according to claim 3, wherein the descriptor comprises a file which contains a set of unique elements, and each unique element corresponds to a different one of the plurality of blocks.

5. The method according to claim 4, wherein the unique element comprises a bit in the file.

6. The method according to claim 5, wherein the modifying includes toggling at least one bit in response to receipt of a corresponding block of the first portion at the destination device.

7. The method according to claim 6, wherein the informing comprises transmitting the descriptor having toggled bits to the source device via the high integrity connection.

8. The method according to claim 7, wherein the method is repeated until each of the blocks in the first portion is received at the destination device.

9. The method according to claim 8, wherein the method is repeated for a plurality of portions until all of the file is transferred.

10. The method according to claim 1, wherein a plurality of parallel data transfer connections are established, each parallel data transfer connection including a high speed connection and a high integrity connection, and each parallel transfer connection is operable to perform said method to transfer a respective one of a plurality of portions of a file.

11. The method according to claim 1, wherein a plurality of parallel data transfer connections are established, each parallel data transfer connection including at least one high integrity connection and a plurality of high speed connections, and the plurality of parallel high speed connections are operable to perform said method in concert with the at least one high integrity connections to transfer a respective one of a plurality of portions of a file.

12. The method according to claim 1, wherein the at least one high speed connection employs a User Datagram Protocol (UDP).

13. The method according to claim 12, wherein the at least one high integrity connection employs a Transmission Control Protocol (TCP).

14. The method according to claim 1, wherein the source device is a server and the destination device is a client device.

15. The method according to claim 14, wherein the client device is a handheld computing device.

16. The method according to claim 1, wherein the source device and the destination device are both servers.

17. The method according to claim 1, wherein the method is executed as an application directly controllable by a user.

18. The method according to claim 1, wherein commands are received from a user by at least one of a command line interface and a graphical user interface.

19. The method according to claim 1, wherein the method is executed as a service controllable by an application.

20. The method according to claim 19, wherein the service is controllable by way of at least one of an application programming interface, a script, and a remote procedure call.

21. The method according to claim 1, wherein the method is initiated by the source device.

22. The method according to claim 1, wherein the method is initiated by the destination device.

23. A computing device operable to communicate with other computing devices to perform a parallel data transfer, the computing device comprising:
    a microprocessor;
    a memory in operative communication with the microprocessor and operative to store one or more files;
    a network communication device operative to communicate data packets to a remote device on a network using a high integrity connection and a high speed connection; and
    a parallel data transfer module in operative communication with the microprocessor and the network communication device, wherein the parallel data transfer module is operative to:
        receive a descriptor over the high integrity connection regarding blocks of data received over the high speed connection, wherein the descriptor is at least two bits, wherein a first bit, of the descriptor, represents a first block of data of at least a portion of a superblock of data to be sent, and wherein a second bit, of the descriptor, represents a second block of data of at least the portion of the superblock of data to be sent;
        creating a descriptor file by updating the descriptor based on the blocks of data received over the high speed connection; and
        communicate the updated descriptor file over the high integrity connection using the network communication device.

24. A method for receiving data at a destination device from a source device, comprising:
    receiving data at the destination device from the source device over at least one high speed connection;
    acquiring a descriptor at the destination device regarding the data from the source device over at least one high integrity connection, wherein the descriptor is at least two bits, wherein a first bit, of the descriptor, represents a first block of data of at least a portion of a superblock of data to be sent, and wherein a second bit, of the descriptor, represents a second block of data of at least the portion of the superblock of data to be sent;
    correlating, at the destination device, data received from the source device to the descriptor;
    modifying the descriptor based on data received at the destination device over the high speed connection;
    sending to the source device the modified descriptor; and
    receiving data at the destination device that has been resent by the source device using the at least one high speed connection.

25. A method of sending data from a source device to a destination device, comprising:
    sending data from the source device to the destination device using at least one high speed connection;
    transmitting a descriptor regarding the data from the source device to the destination device using at least one high integrity connection, wherein the descriptor is at least two bits, wherein a first bit, of the descriptor, represents a first block of data of at least a portion of a superblock of data to be sent, and wherein a second bit, of the descriptor, represents a second block of data of at least the portion of the superblock of data to be sent;
    receiving, at the source device, a modified descriptor including the identity of data not received by the destination device using the at least one high integrity connection; and
    resending, at the source device, data not received by the destination device to the destination device using the at least one high speed connection.

* * * * *